(12) United States Patent
Park

(10) Patent No.: US 11,731,548 B2
(45) Date of Patent: Aug. 22, 2023

(54) VEHICLE TABLE DEVICE

(71) Applicant: Jae Whaon Park, Cheonan-si (KR)

(72) Inventor: Jae Whaon Park, Cheonan-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 71 days.

(21) Appl. No.: 17/471,829

(22) Filed: Sep. 10, 2021

(65) Prior Publication Data

US 2022/0080871 A1    Mar. 17, 2022

(30) Foreign Application Priority Data

Sep. 11, 2020  (KR) .................. 10-2020-0117195

(51) Int. Cl.
*B60N 3/00* (2006.01)
*B60R 7/06* (2006.01)
*F16D 7/04* (2006.01)

(52) U.S. Cl.
CPC ............... *B60N 3/002* (2013.01); *B60R 7/06* (2013.01); *F16D 7/044* (2013.01)

(58) Field of Classification Search
CPC ......... B60N 3/002; B60N 3/001; B60R 7/06; B60R 2011/0084; B60R 2011/0092; F16D 7/044; A47B 31/06; F16H 1/16; F16H 7/02
USPC ................................................. 296/37.12
See application file for complete search history.

(56) References Cited

U.S. PATENT DOCUMENTS

| | | | | | |
|---|---|---|---|---|---|
| 2,275,060 | A | * | 3/1942 | Griffin | B60N 3/002 312/246 |
| 2,430,049 | A | * | 11/1947 | Flory | B60N 3/007 108/46 |
| 2,522,602 | A | * | 9/1950 | Burns | B60N 3/002 108/45 |
| 2,592,032 | A | * | 4/1952 | Henderson | B60N 3/002 108/45 |
| 2,657,967 | A | * | 11/1953 | Gilchrist | B60R 7/06 312/246 |
| 2,860,021 | A | * | 11/1958 | Steele | B60N 3/002 108/45 |
| 4,902,061 | A | * | 2/1990 | Plavetich | B60N 3/102 296/37.12 |
| 5,460,309 | A | * | 10/1995 | Nehl | B60R 7/082 312/274 |
| 7,494,170 | B2 | * | 2/2009 | Hanzel | B60R 11/00 296/37.8 |

(Continued)

FOREIGN PATENT DOCUMENTS

| | | | | |
|---|---|---|---|---|
| EP | 2039564 A1 | * | 3/2009 | ............ B60N 3/002 |
| JP | 2018-197056 A | | 12/2018 | |
| KR | 1315668 | * | 10/2013 | ............ B60N 2/793 |

*Primary Examiner* — Pinel E Romain
(74) *Attorney, Agent, or Firm* — Morgan, Lewis & Bockius LLP

(57) ABSTRACT

The present disclosure relates to a vehicle table device that is extracted toward a driver or a passenger to place food or books thereon for a simple meal or reading, the vehicle table device including: a housing that is accommodated inside a dashboard and has an open front surface; a table that is accommodated inside the housing and selectively extracted from or retracted into the front surface of the housing; and an operation member that is disposed between a bottom surface of the housing and the table and allows the table to be extracted from or retracted into the housing.

19 Claims, 22 Drawing Sheets

(56) References Cited

U.S. PATENT DOCUMENTS

| | | | | |
|---|---|---|---|---|
| 7,926,861 | B2* | 4/2011 | Merlo | B60R 7/06 |
| | | | | 224/483 |
| 8,646,393 | B2* | 2/2014 | Souillac | B60R 11/00 |
| | | | | 108/45 |
| 8,919,852 | B2* | 12/2014 | Schulz | E05B 83/28 |
| | | | | 49/423 |
| 10,023,091 | B2* | 7/2018 | Bendewald | B60N 3/001 |
| 11,326,383 | B2* | 5/2022 | Rapetti | E05F 15/627 |
| 2006/0197353 | A1* | 9/2006 | Hanzel | B60R 11/00 |
| | | | | 296/37.12 |

* cited by examiner

VEHICLE TABLE DEVICE

CROSS-REFERENCE TO RELATED APPLICATION

This application claims priority to and the benefit of Korean Patent Application No. 10-2020-0117195, filed on Sep. 11, 2020, the disclosure of which is incorporated herein by reference in its entirety.

BACKGROUND

1. Field

The present disclosure relates to a table accommodated in a dashboard of a vehicle and relates to a vehicle table device that is extracted toward a driver or a passenger to place foods or books thereon for a simple meal or reading, and a method of controlling a virtual keyboard thereof.

2. Discussion of Related Art

In general, dashboards are mounted in front of a driver's seat and a passenger's seat of a vehicle, various instruments and switches of the vehicle are installed on the dashboard in front of the driver's seat, and a glove box for accommodating a simple object is installed on the dashboard in front of the passenger's seat.

Further, an audio system and the like are installed in a central portion between the dashboard in front of the driver's seat in which the various instruments are installed and the dashboard in front of the passenger's seat in which the glove box is installed.

Meanwhile, in recent years, the number of vehicles equipped with a table device on the dashboard in front of the passenger's seat is increasing.

Vehicle table devices may be used by a passenger boarded in the passenger's seat for reading or business processing or are also used to safely place food thereon and simply eat a meal inside the vehicle.

However, since the table provided in the vehicle is mounted on and extracted from a limited layout of the dashboard, the area of the extracted table is necessarily narrow.

As a result, when using the table, the passenger may feel uncomfortable due to the relatively narrow area.

Further, when a vehicle crash occurs while the table provided inside the vehicle is extracted from the dashboard, an accident may occur due to the table.

To this end, a method of weakening a table structure so that the table may be easily broken on collision is often applied, but the rigidity of the table is weakened due to this method.

Further, in the case of a table to which an actuator is applied and which is operated by an electric method, a method is also applied in which a slip device is provided so that, when a certain load or more occurs, the table is retracted without operating the actuator. However, in this structure, when a sudden stop/collision occurs in a state in which the table is retracted, the table is unintentionally extracted, which may cause injury to the passenger.

In addition, the conventional table provided in the existing vehicle may serve as a simple table on which an object may be placed but may not simultaneously perform a multimedia input device function.

In order for the table to perform the input device function, a switch function should be provided to the table, and in a state in which the function is provided, an input function unwanted by a user is activated due to the object placed on the table.

SUMMARY

The present disclosure is directed to providing a vehicle table device in which, when a vehicle crash occurs in a state in which a table is extracted from a dashboard, the table is easily retracted into the dashboard, and when a vehicle crash occurs in a state in which the table is retracted into the dashboard, the table is prevented from being extracted from the dashboard.

The above-described purpose, other purposes, advantages, and features of the present disclosure and a method of achieving the above-described purpose, other purposes, advantages, and features will become apparent with reference to embodiments described below in detail together with the accompanying drawings.

A vehicle table device includes: a housing that is accommodated inside a dashboard and has an open front surface; a table that is accommodated inside the housing and selectively extracted from or retracted into the front surface of the housing; and an operation member that is disposed between a bottom surface of the housing and the table and allows the table to be extracted from or retracted into the housing.

The operation member may suppress the table from being extracted from the housing when the table is accommodated in the housing and an external force is applied to the table in a direction toward a passenger, and the operation member may retract the table into the housing in a non-powered manner when the table is extracted from the housing and an external force is applied in a direction toward the housing.

The housing may include a first accommodation space and a second accommodation space which is formed at one end of the first accommodation space and in which the table is accommodated.

The table may include: a base part that has a quadrangular panel and is accommodated in the second accommodation space; an extension part that extends from a rear surface of the base part and is accommodated in the first accommodation space; and a handle part that is disposed on a front surface of the base part, wherein the operation member may be disposed on a lower surface of the base part.

A width of the first accommodation space may be smaller than a width of the second accommodation space in a width direction, and stepped parts may be respectively formed between two ends of the first accommodation space in the width direction and two ends of the second accommodation space in the width direction.

A width of the base part may be greater than the width of the first accommodation space and smaller than the width of the second accommodation space.

When the base part is accommodated in the second accommodation space, the rear surface of the base part may come into contact with the stepped parts.

The operation member may include: a driving unit that is disposed between the housing and the table and generates power so that the table is selectively extracted from or retracted into the housing; a fixed rail that is fixed to the bottom surface of the housing; and a movable rail that is disposed on a lower surface of the table and slidably coupled to the fixed rail.

The driving unit may include: an actuator that is fixed to the bottom surface of the housing and generates power; a gear part that is connected to the actuator and receives the power generated from the actuator; a slip member that is coupled to the gear part and receives the power generated from the actuator through the gear part; a driving pulley that is fixed to the bottom surface of the housing and rotated by operation of the actuator; a driven pulley fixed to a position spaced apart from the driving pulley on the bottom surface of the housing; and a transfer belt that has one end connected to the driving pulley, the other end connected to the driven pulley, and a center region connected to the table, and transfers the table according to rotation of the driving pulley.

The slip member may block rotation of the gear part when an external force is applied to the table in a direction toward a passenger or a direction toward the housing.

The slip member may include: a first slip part that is disposed below the gear part; a second slip part that is disposed below the first slip part and rotates together with the first slip part or slips from the first slip part; a slip spring that is disposed below the second slip part and elastically supports the first slip part; and a spring support member that is disposed between the second slip part and the driving pulley, has the slip spring accommodated therein, and supports the slip spring.

The first slip part may include: a first cylindrical part that constitutes a body of the first slip part; a plurality of first inclination portions that are formed on a lower surface of the first cylindrical part in a circumferential direction; and a plurality of first vertical portions that are formed on the lower surface of the first cylindrical part on sides opposite to the first inclination portions, and the second slip part may include: a second cylindrical part that constitutes a body of the second slip part; a plurality of second inclination portions that are formed on an upper surface of the second cylindrical part in a circumferential direction and each are in contact with one of the plurality of first inclination portions; and a plurality of second vertical portions that are formed on the upper surface of the second cylindrical part on sides opposite to the second inclination portions and each are in contact with one of the plurality of first vertical portions.

In a state in which the table is accommodated in the housing, when an external force greater than rotational inertia of a worm wheel gear is applied to the table in a direction toward a passenger, the second vertical portions may press the first vertical portion, a self-locking phenomenon may occur between the worm wheel gear and a worm gear, and thus a rotational force of the driving pulley may be blocked from being transferred to the actuator.

In a state in which the table is extracted from the housing, when an external force greater than a tensile force of the slip spring is applied to the table in a direction toward the housing, the first inclination portions may slip from the second inclination portions, the second slip parts may be separated from the first slip parts, and thus a rotational force of the driving pulley may be blocked from being transferred to the first slip part.

A fixing part fixed to the table so that the table is transferred in a transfer direction of the transfer belt may be coupled to the center region of the transfer belt.

The fixing part may be located to be adjacent to the driving pulley in a state in which the table is accommodated in the housing and may be located adjacent to the driven pulley in a state in which the table is extracted from the housing.

A vehicle table device includes: a housing that is accommodated inside a dashboard and has an open front surface; a table that is accommodated inside the housing and is selectively extracted from or retracted into the front surface of the housing; and an operation member that includes a fixed rail fixed to a bottom surface of the housing, a movable rail slidably coupled to the fixed rail and fixed to a lower surface of the table, and a driving unit disposed between the housing and the table to generate power.

A width of the fixed rail may be smaller than a width of the movable rail.

The fixed rail may include: a first body portion that constitutes a body of the fixed rail, is fixed to the bottom surface of the housing, and has first side walls extending upward from two ends thereof; and guide protrusions that extend from the first side walls in a lengthwise direction and protrude in opposite directions, and the movable rail may include: a second body portion that constitutes a body of the movable rail, is disposed below the table, and has second side walls extending downward from two ends thereof; guide grooves which are formed in inner surfaces for the second side walls, respectively, and extend in the lengthwise direction and into which the guide protrusions are inserted; and a support protrusion that is formed between the second side walls and has an outer surface supporting inner surfaces of the first side walls.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
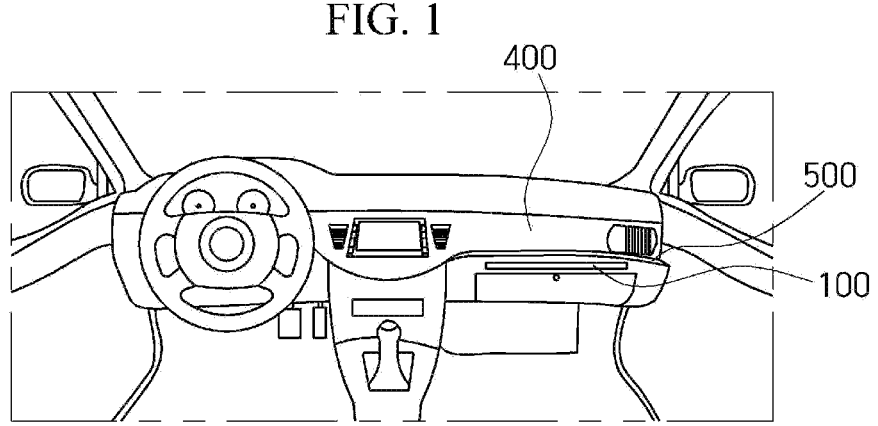
FIG. 1 is a schematic view of a vehicle interior showing a position in which a vehicle table device according to a first embodiment of the present disclosure is mounted.

Embodiments of the present disclosure are provided to more completely describe the present disclosure to those skilled in the art, the following embodiments may be modified into various other forms, and the scope of the present disclosure is not limited to the following embodiments. Rather, these embodiments are provided to make this disclosure more thorough and complete and completely transfer the spirit of the present disclosure to those skilled in the art. Further, in the following drawings, each component is exaggerated for convenience and clarity of description, and the same reference numerals refer to the same components on the drawings. In the present specification, a term "and/or" includes any one and all combinations of one or more of those listed items.

Terms used herein are used to describe specific embodiments, not to limit the present disclosure.

As used in the present specification, a singular form may include a plural form unless the context clearly indicates otherwise. Further, when used in the present specification, the terms "comprise" and/or "comprising" specify the presence of recited shapes, numbers, steps, actions, members, elements, and/or groups thereof, does not exclude the presence or addition of one or more other shapes, numbers, actions, members, and elements and/or groups.

Hereinafter, exemplary embodiments of the present disclosure will be described in detail with reference to the accompanying drawings.

Figure 2:
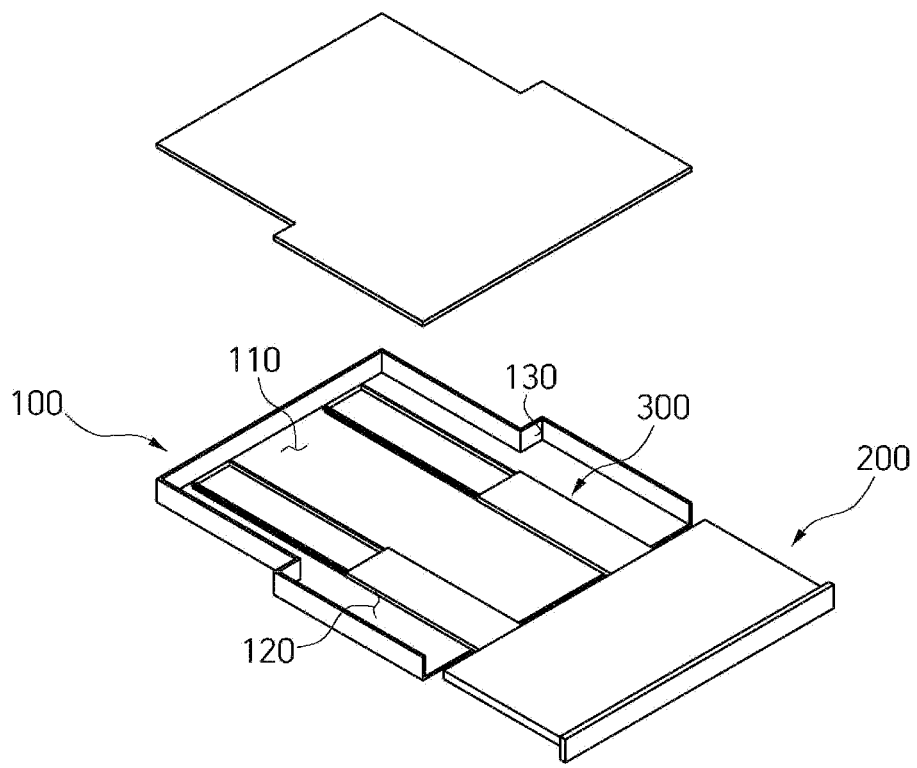
FIG. 2 is a perspective view showing the vehicle table device according to the first embodiment of the present disclosure.
Figure 3:
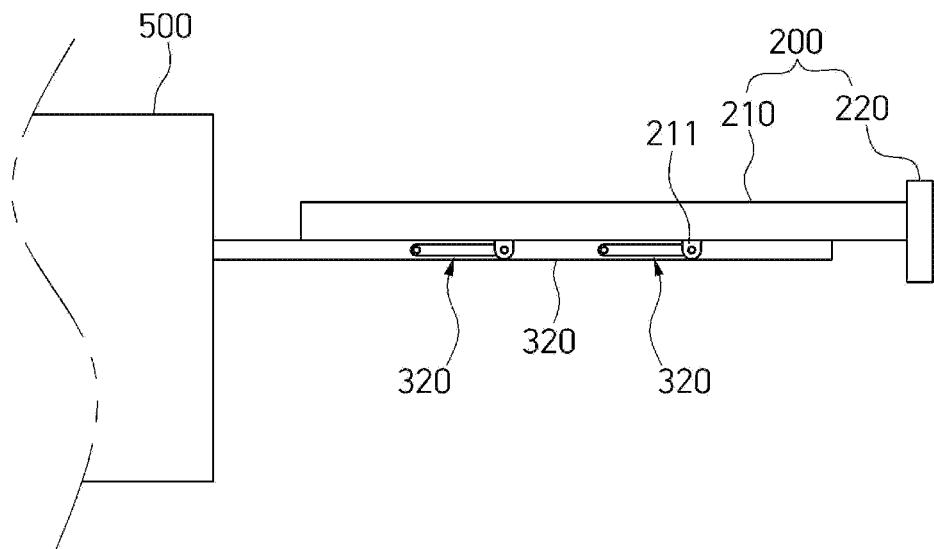
FIG. 3 is a perspective view showing a state in which the vehicle table device according to the first embodiment of the present disclosure is extracted from a garnish.
Figure 4:
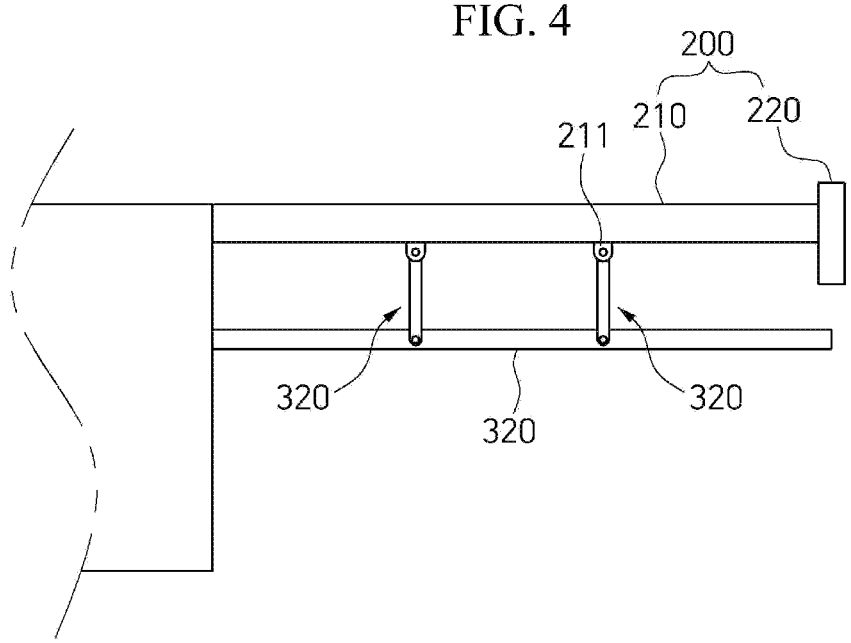
FIG. 4 is a side view showing a state in which the vehicle table device according to the first embodiment of the present disclosure is tilted upward.
Figure 5:
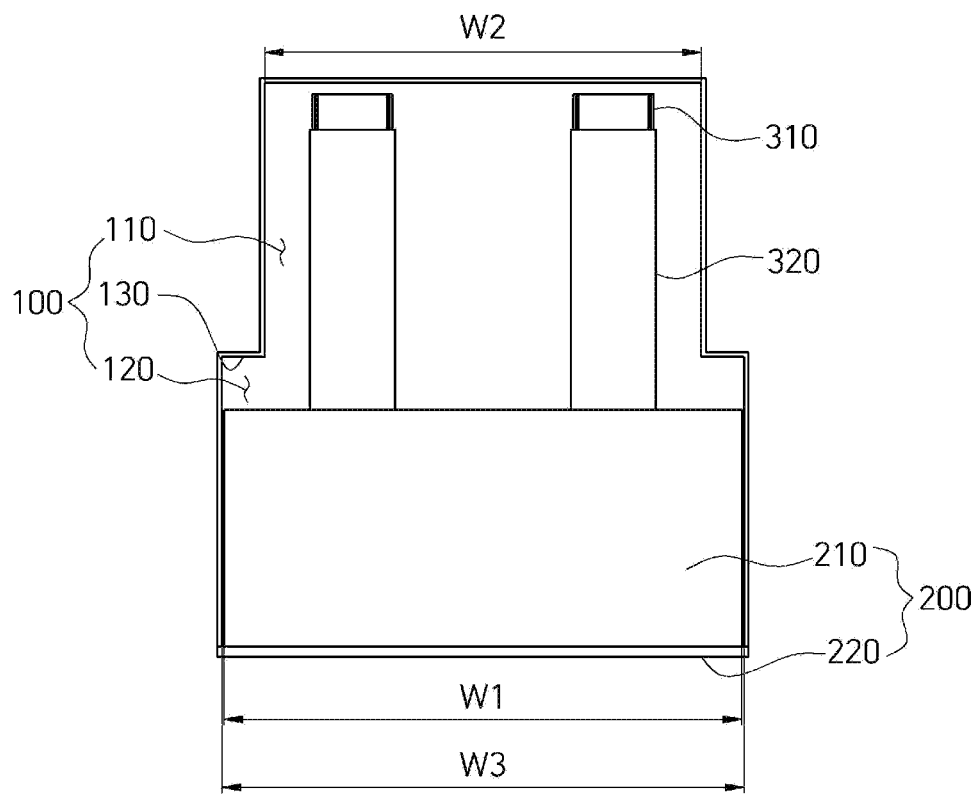
FIG. 5 is a plan view showing the vehicle table device according to the first embodiment of the present disclosure.
Figure 6:
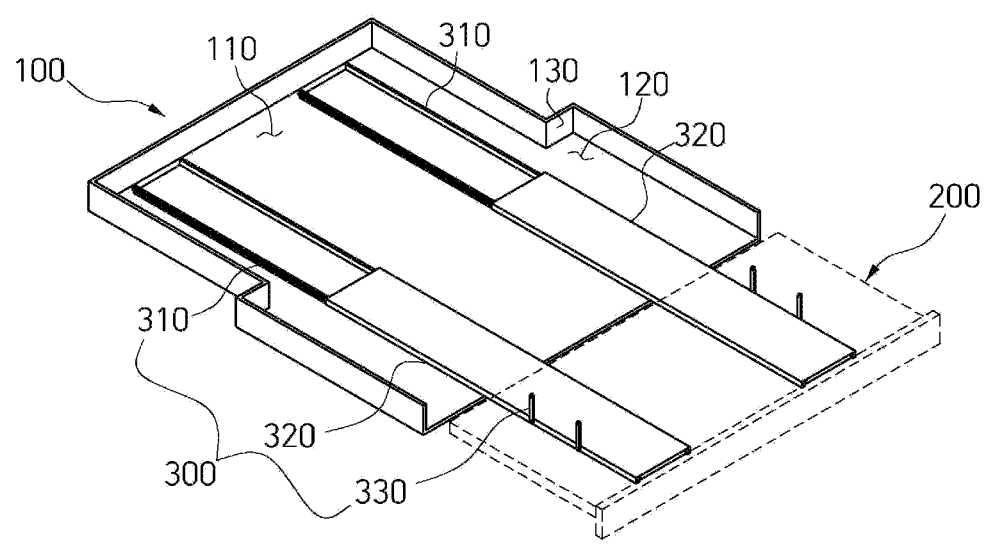
FIG. 6 is a perspective view showing an operation member of the vehicle table device according to the first embodiment of the present disclosure.
Figure 7:
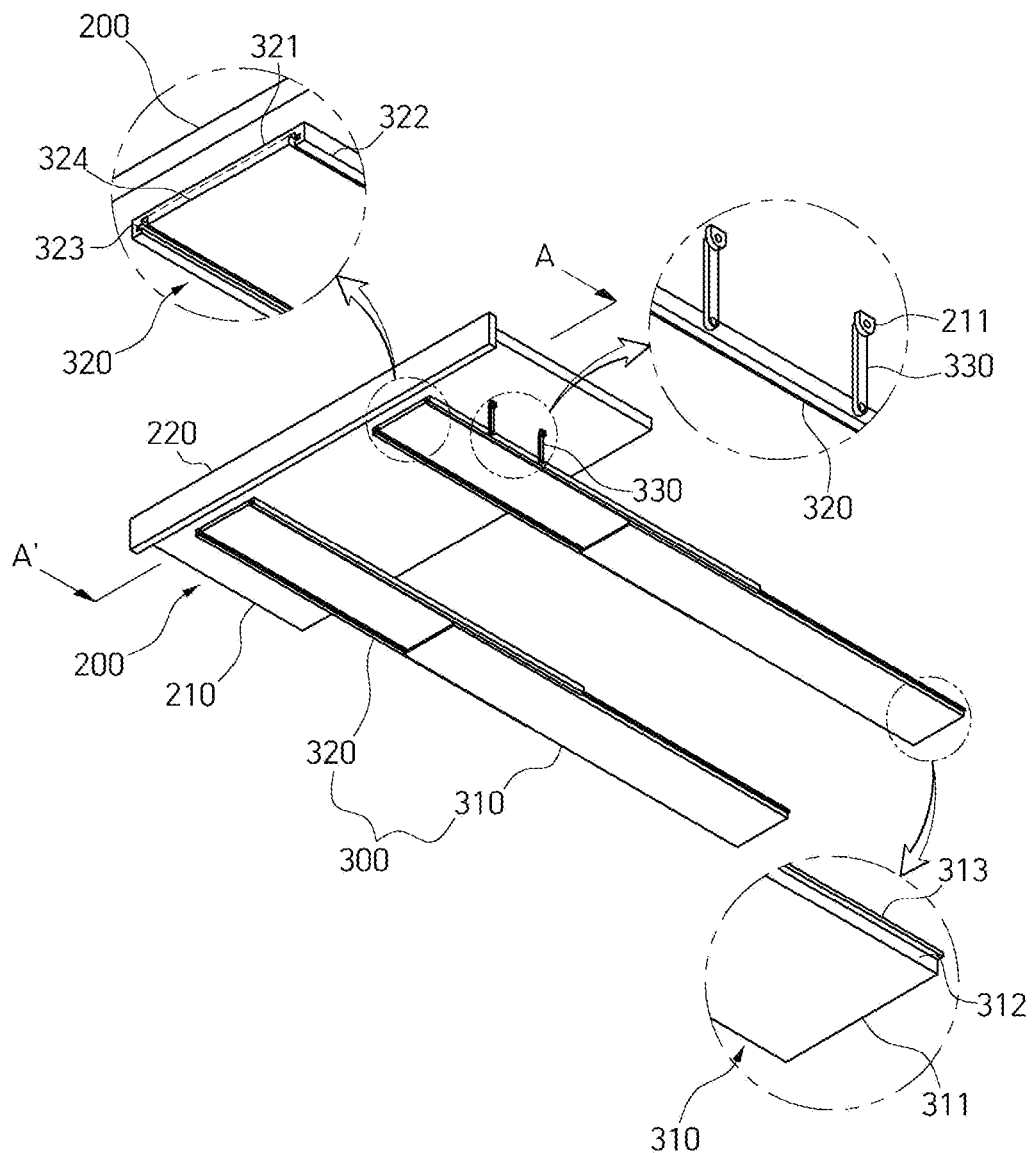
FIG. 7 is a bottom perspective view showing the operation member and a table of the vehicle table device according to the first embodiment of the present disclosure.
Figure 8:
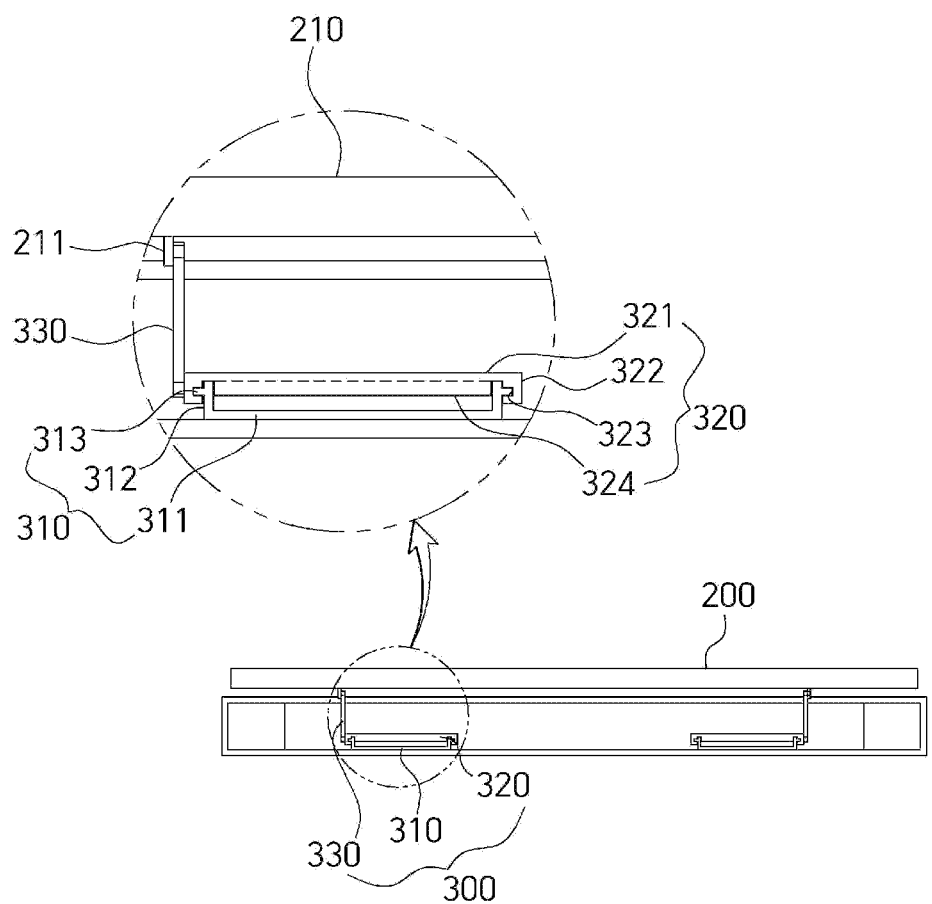
FIG. 8 is a sectional view taken along line A-A of FIG. 7.
Figure 9:
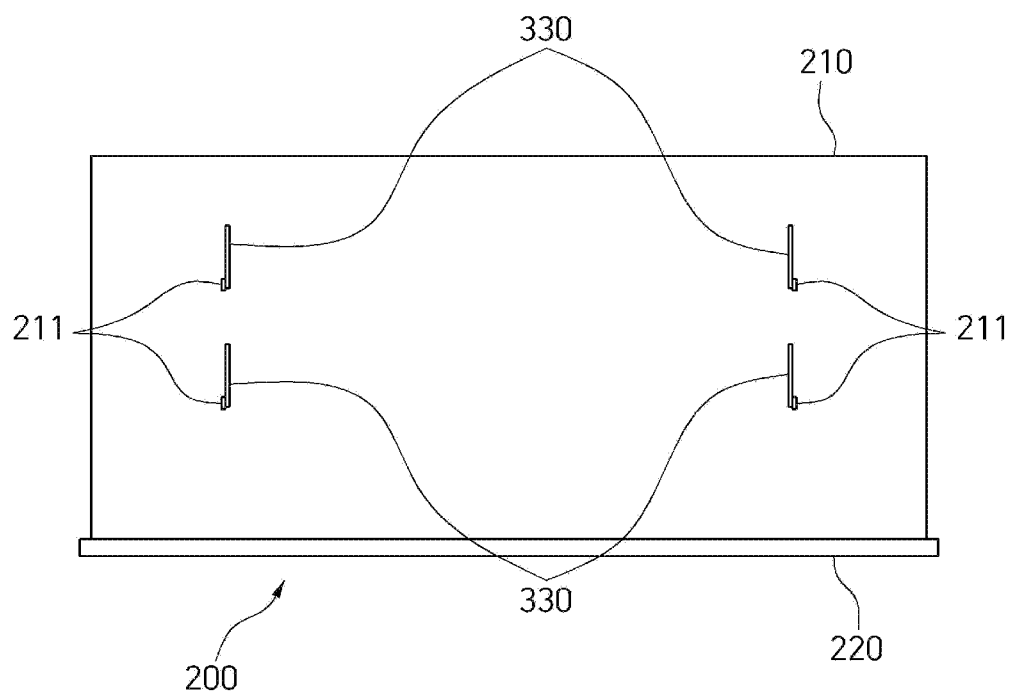
FIG. 9 is a bottom view showing the table of the vehicle table device according to the first embodiment of the present disclosure.

FIG. 1 is a schematic view of a vehicle interior showing a position in which a vehicle table device according to a first embodiment of the present disclosure is mounted, FIG. 2 is a perspective view showing the vehicle table device according to the first embodiment of the present disclosure, FIG. 3 is a perspective view showing a state in which the vehicle table device according to the first embodiment of the present disclosure is extracted from a garnish, FIG. 4 is a side view showing a state in which the vehicle table device according to the first embodiment of the present disclosure is tilted upward, FIG. 5 is a plan view showing the vehicle table device according to the first embodiment of the present disclosure, FIG. 6 is a perspective view showing an operation member of the vehicle table device according to the first embodiment of the present disclosure, FIG. 7 is a bottom perspective view showing the operation member and a table of the vehicle table device according to the first embodiment of the present disclosure, FIG. 8 is a sectional view taken along line A-A of FIG. 7, and FIG. 9 is a bottom view showing the table of the vehicle table device according to the first embodiment of the present disclosure.

Referring to FIGS. 1 to 9, a vehicle table device according to a first embodiment of the present disclosure is accommodated inside a dashboard 400 including a garnish 500 having a flat upper surface.

The vehicle table device according to the first embodiment of the present disclosure includes a housing 100, a table 200, and an operation member 300.

The housing 100 is accommodated in a lower region than the garnish 500 inside the dashboard 400 and has an open front surface.

That is, the housing 100 has a bottom surface, an upper surface, two side surfaces, and a rear surface that are sealed.

Meanwhile, in the drawings, in order to prevent the inside of the housing 100 from being covered, it is shown that the upper surface is separated or deleted, but the bottom surface constituting the housing 100, the upper surface corresponding to the bottom surface, the two side surfaces connecting the bottom surface and the upper surface, and the rear surface may be integrally formed.

The housing 100 has an internal space including a first accommodation space 110 and a second accommodation space 120.

When the housing 100 is accommodated in the dashboard 400, the first accommodation space 110 is disposed in an interior direction (engine room direction) of the dashboard 400.

The second accommodation space 120 is formed at one end (in a passenger direction) of the first accommodation space 110, and the area of the second accommodation space 120 is large enough to accommodate the table 200.

When the table 200 is retracted into the housing 100, the table 200 is accommodated in the second accommodation space 120.

Further, the width of the first accommodation space 110 is smaller than the width of the second accommodation space 120.

Thus, stepped parts 130 are formed between two ends of the first accommodation space 110 and two ends of the second accommodation space 120.

When the table 200 is accommodated in the second accommodation space 120, the stepped parts 130 come into contact with the rear surface of the table 200.

Thus, when the table 200 that has been extracted to the outside of the housing 00 is retracted into the second accommodation space 120, the stepped parts 130 may effectively block the table 200 from being excessively retracted into the first accommodation space 110.

Food or books may be placed on an upper surface of the table 200 when a user eats a simple meal or reads a book.

As shown in FIGS. 3 and 4, the table 200 is selectively extracted from or retracted into the open front surface of the housing 100 or is tilted upward after the extraction.

When the table 200 according to the first embodiment of the present disclosure is tilted upward, the upper surface of the table 200 is continuously connected to the upper surface of the garnish 500.

In detail, the table 200 is extracted from the housing 100 and is then tilted upward so that the upper surface thereof is continuously connected to the upper surface of the garnish 500, and accordingly, the table 200 can be used more widely together with the upper surface of the garnish 500.

Thus, in the table 200 according to the first embodiment of the present disclosure, the passenger may utilize the large region of the table 200 space for more activities, and objects placed on the upper surface of the table 200 may be also more stably positioned.

The table 200 includes a base part 210 and a handle part 220.

The base part 210 is realized as a quadrangular panel and is extracted from or retracted into the second accommodation space 120 or is tilted upward after the extraction according to the needs of the passenger.

In detail, the base part 210 is accommodated in the second accommodation space 120 of the housing 100 when the table 200 is not in use and is extracted from the second accommodation space 120 of the housing 100 when the passenger needs to use the table 200.

Further, when the wider area of the table 200 needs to be used as needed, the base part 210 is extracted from the second accommodation space 120 of the housing 100 and is then tilted upwardly.

As shown in FIG. 5, a width W1 of the base part 210 is greater than a width W2 of the first accommodation space 110 and is smaller than a width W3 of the second accommodation space 120.

Thus, when the base part 210 is accommodated in the second accommodation space 120, the rear surface of the base part 210 comes into contact with the stepped parts 130.

That is, when the base part 210 is retracted into the second accommodation space 120, the base part 210 may be effectively blocked from being excessively retracted up to the first accommodation space 110.

The handle part 220 is disposed on a front surface of the base part 210.

Further, when the table 200 is accommodated in the second accommodation space 120, the handle 220 may seal the open front surface of the housing 100.

As shown in FIG. 6, the operation member 300 has a lower surface fixed to the bottom surface of the housing 100 and an upper surface fixed to a lower surface of the table 200.

That is, the operation member 300 is coupled to a lower surface of the base part 210 of the table 200.

Further, the operation member 300 allows the table 200 to be extracted from, retracted into, or tilted upward from the housing 100.

In detail, the operation member 300 moves the table 200 to the second accommodation space 120 when the table 200 is not in use in a state in which the table 200 is extracted from the second accommodation space 120, and moves the table 200 from the second accommodation space 120 toward the passenger when the table 200 is used in a state in which the table 200 is accommodated in the second accommodation space 120.

Further, when a user wants to use the table 200 more widely in a state in which the table 200 is extracted from the second accommodation space 120, as shown in FIG. 4, the operation member 300 tilts the table 200 upward, and thus an upper surface of the base part 210 and the upper surface of the garnish 500 are continuously formed.

The operation member 300 includes a fixed rail 310, a movable rail 320, and a tilting link 330.

The fixed rail 310 is fixed to the bottom surface of the housing 100 and is fixed to cross the first accommodation space 110 and the second accommodation space 120 of the housing 100.

Further, two fixed rails 310 are formed to be spaced apart from each other by a distance in a width direction toward the housing 100.

Accordingly, the fixed rail 310 can stably support the table 200 disposed thereon.

The fixed rail 310 includes a first body portion 311 and a guide protrusion 313.

The first body portion 311 constitutes a body of the fixed rail 310 and is fixed to the bottom surface of the housing 100.

When viewed from below, the first body portion 311 is formed in a long rectangular shape to cross the first accommodation space 110 and the second accommodation space 120.

Further, first side walls 312 extend upward from two ends of the first body portion 311.

As shown in FIGS. 7 and 8, the guide protrusions 313 extend in a lengthwise direction from the first side walls 312 formed at two ends of the first body portion 311 and protrude in two directions.

The guide protrusion 313 is slidably coupled to the movable rail 320.

The movable rail 320 is disposed on the lower surface of the table 200 and is slidably coupled to the fixed rail 310.

That is, the movable rails 320 are located at positions corresponding to the fixed rails 310 and are provided in the same number as the number of the fixed rails 310.

The movable rail 320 is slidably coupled to the fixed rail 310, and thus the movable rail 320 slides in a direction crossing the first accommodation space 110 and the second accommodation space 120.

The movable rail 320 includes a second body portion 321 and a guide groove 323.

The second body portion 321 constitutes a body of the movable rail 320 and is disposed below the table 200 at a position corresponding to the first body portion 311.

Further, second side walls 322 extend downward from two ends of the second body portion 321.

As shown in FIGS. 7 and 8, the guide groove 323 extends in a lengthwise direction from inner surfaces of the second side walls 322 formed at two ends of the second body portion 321.

Further, the guide protrusion 313 of the fixed rail 310 is slidably coupled to the guide groove 323.

Accordingly, the movable rail 320 slides along the guide protrusion 313 of the fixed rail 310 easily.

Meanwhile, the width of the movable rail 320 is greater than the width of the fixed rail 310.

Accordingly, since the movable rail 320 supporting the table 200 has a larger area to support the lower surface of the table 200 than the fixed rail 310, when the table 200 is slid and moved along the fixed rail 310, the table can be firmly and stably supported.

Meanwhile, the movable rail 320 according to a second embodiment of the present disclosure may further include a support protrusion 324.

The support protrusion 324 is formed between the second side walls 322 extending downward from the two ends of the second body portion 321 and has an outer surface in contact with an inner surface of the first side wall 312.

Accordingly, the support protrusion 324 may allow the fixed rail 310 and the movable rail 320 to be firmly assembled with each other and effectively prevent the movable rail 320 from escaping from the fixed rail 310.

As shown in FIGS. 7 and 8, the tilting link 330 may be formed in a shape of a plurality of bars and is disposed on two sides of the movable rail 320.

The tilting link 330 has one end rotatably coupled to the movable rail 320 and the other end rotatably coupled to the lower surface of the base part 210.

Meanwhile, a boss part 211 extends downward from the lower surface of the base part 210 to which the other end of the tilting link 330 is coupled.

A total of four boss parts 211 may be formed to be spaced apart from each other by a distance in the lengthwise direction and the width direction.

That is, as shown in FIG. 9, the total of four boss parts 211 are formed at positions corresponding to vertexes of a quadrangular shape on the lower surface of the base part 210.

When a coupling structure of the tilting link 330, the table 200, and the movable rail 320 is described in more detail, first, one end of the tilting link 330 is rotatably coupled to an outer surface of the second side wall 322 of the movable rail 320.

Further, the other end of the tilting link 330 is rotatably coupled to the boss part 211 extending downward from the lower surface of the base part 210.

That is, the other end of the tilting link 330 is coupled to the lower surface of the base part 210 through the boss parts 211.

When the one end of the tilting link 330 is rotated from a movable link, while the other end of the tilting link 330 is rotated from the boss part 211, the tilting link 330 tilts the table 200 upward.

In this case, it is obvious that, when the table 200 is tilted upward, the length of the tilting link 330 is a length by which the upper surface of the table 200 and the upper surface of the garnish 500 may be continuously formed.

Hereinafter, an operation process of the vehicle table device according to the first embodiment of the present disclosure having the above structure will be described with reference to the drawings.

Figure 10:
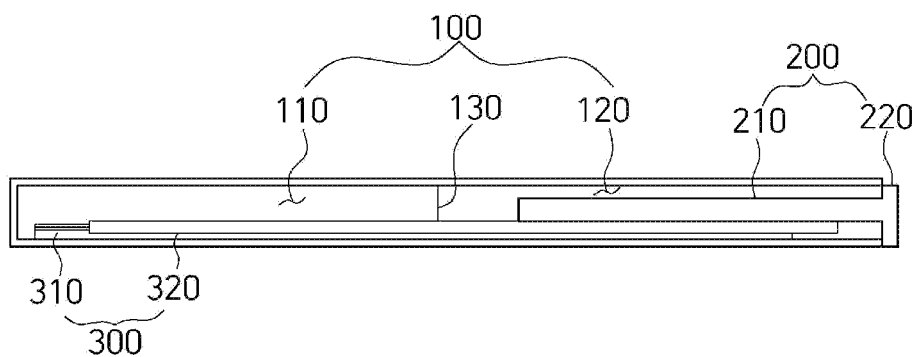
FIGS. 10 to 12 are operational diagrams showing an operation process of the vehicle table device according to the first embodiment of the present disclosure.
Figure 11:
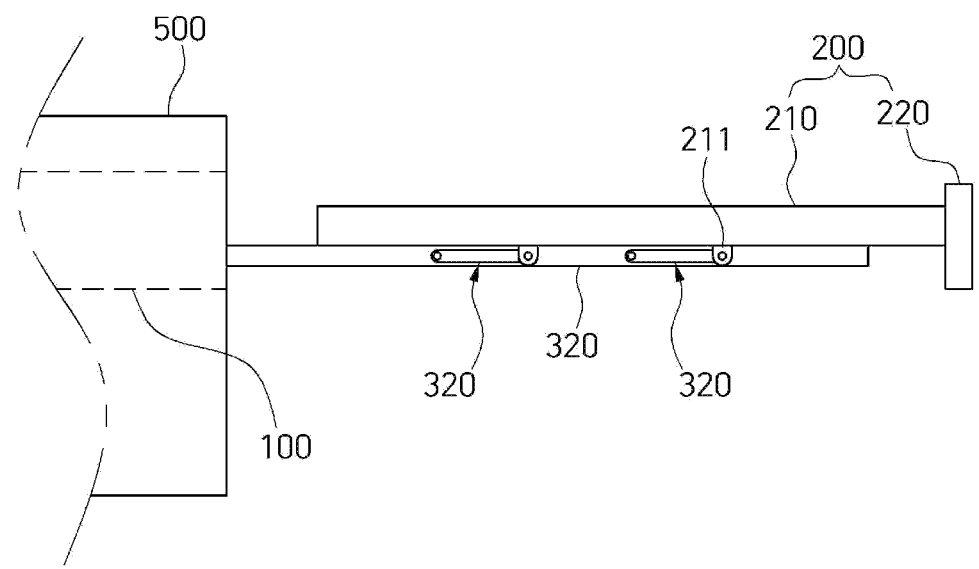
Figure 12:
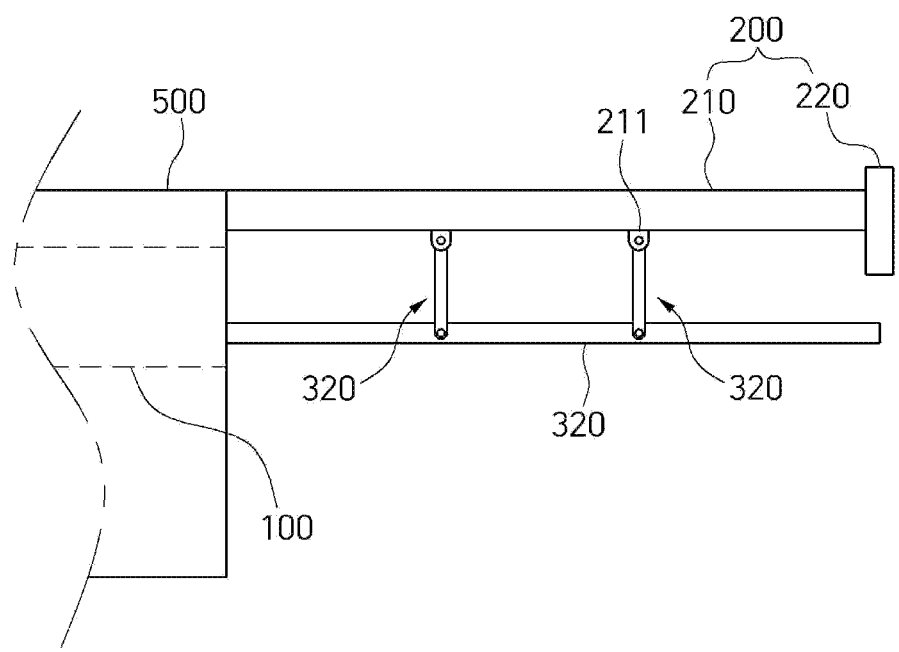

FIGS. 10 to 12 are operational diagrams showing an operation process of the vehicle table device according to the first embodiment of the present disclosure.

Referring to FIG. 10, the fixed rail 310 of the operation member 300 is fixed to the bottom surface of the housing 100, and the movable rail 320 is rotatably coupled to a lower portion of the table 200.

Further, the fixed rail 310 and the movable rail 320 are coupled to each other in a sliding manner.

Thus, when the table 200 is accommodated in the housing 100 disposed at a lower region than the garnish 500 inside the dashboard 400, as shown in FIG. 11, the table 200 may be easily extracted from the inside of the housing 100 in a sliding manner according to the needs of the passenger.

Further, when a user wants to more widely use the table 200 extracted from the housing 100, the table 200 is tilted upward.

The one end of the tilting link 330 is rotatably coupled to the outer surface of the second side wall 322 of the movable rail 320, and the other end of the tilting link 330 is rotatably coupled to the boss part 211 extending downward from the lower surface of the base part 210.

As shown in FIG. 12, when the one end of the tilting link 330 is rotated from the movable link, while the other end of the tilting link 330 is rotated from the boss part 211, the tilting link 330 tilts the table 200 upward.

When the table 200 is tilted upward, as the upper surface of the table 200 and the upper surface of the garnish 500 are continuously connected, the area of the upper surface of the garnish 500 is added to the area of the table 200. Thus, the passenger may utilize the table 200 for more activities, and objects placed on the upper surface of the table 200 may be more stably positioned.

Meanwhile, when a vehicle crash occurs while the table provided inside the vehicle is extracted from the dashboard, an accident may occur due to the table.

Further, in the case of a table to which an actuator is applied and which is operated by an electric method, a method is also applied in which a slip device is provided so that, when a certain load or more occurs, the table is retracted without operating the actuator. However, in this structure, when a sudden stop/collision occurs in a state in which the table is retracted, the table is unintentionally extracted, which may cause injury to the passenger.

In order to prevent this, the vehicle table device according to the second embodiment of the present disclosure may further include a driving unit.

Hereinafter, the operation member according to the second embodiment of the present disclosure will be described in detail with reference to the accompanying drawings.

Figure 13:
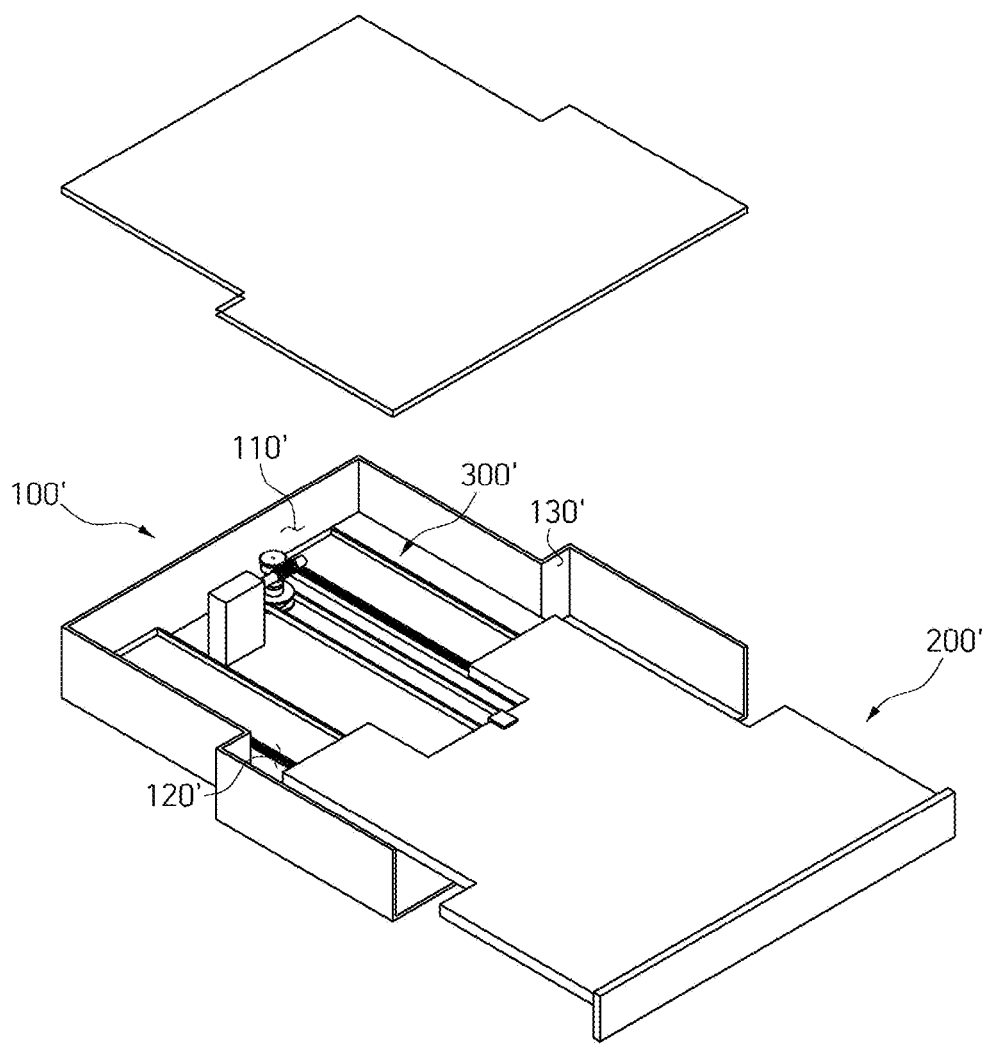
FIG. 13 is a perspective view showing a vehicle table device according to a second embodiment of the present disclosure.
Figure 14:
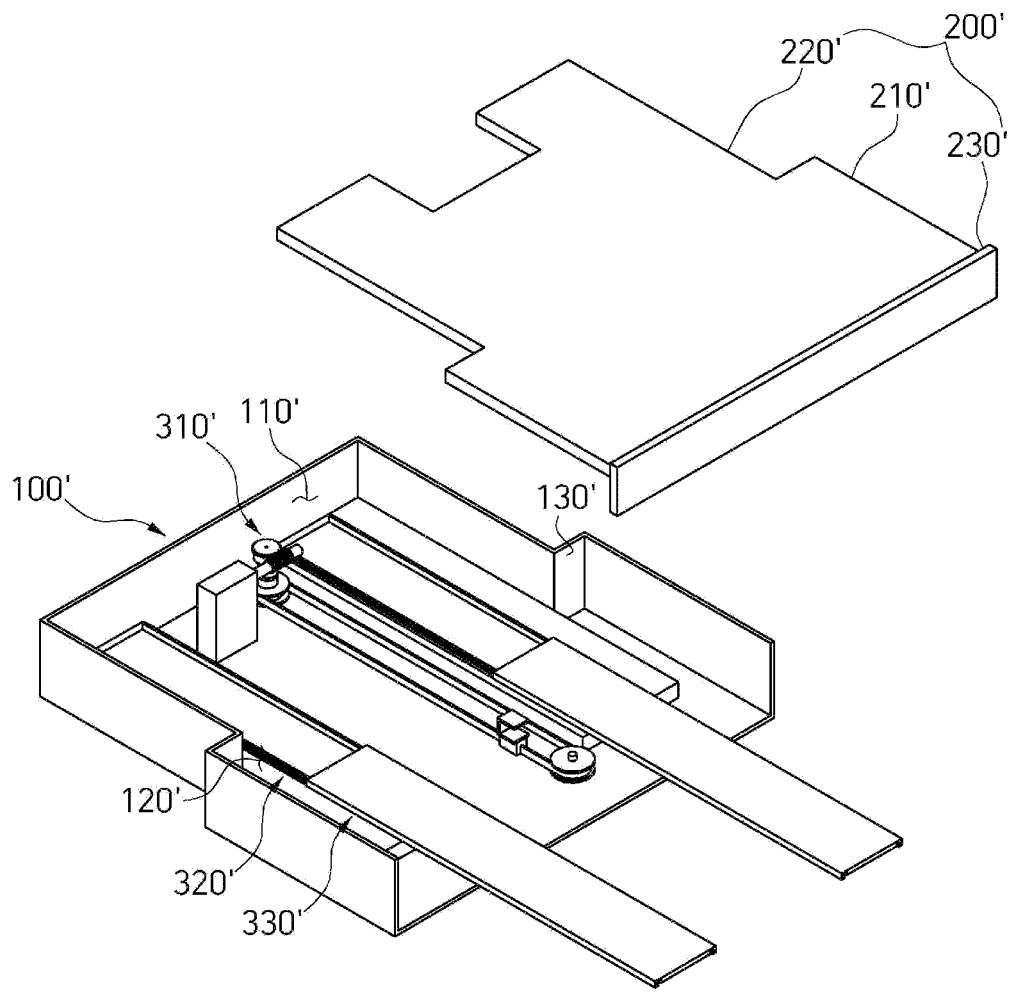
FIG. 14 is an exploded perspective view showing a table in the vehicle table device according to the second embodiment of the present disclosure.
Figure 15:
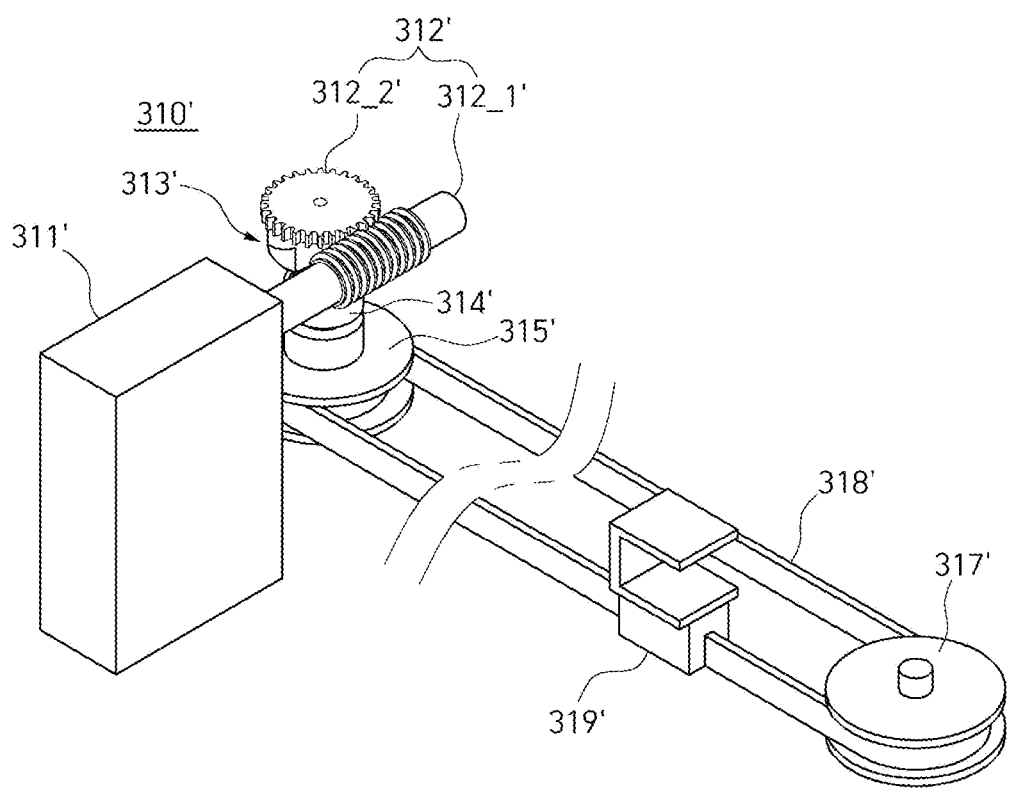
FIG. 15 is a perspective view showing a driving unit of the vehicle table device according to the second embodiment of the present disclosure.
Figure 16:
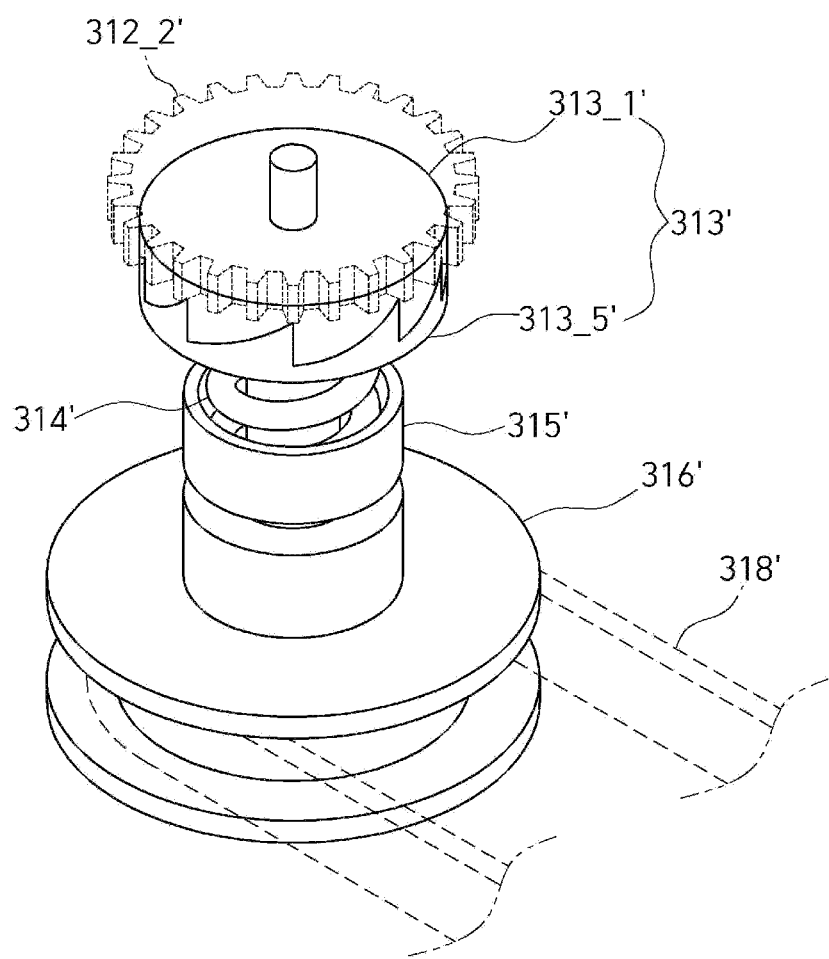
FIG. 16 is a front view showing a slip member and a driving pulley of the vehicle table device according to the second embodiment of the present disclosure.
Figure 17:
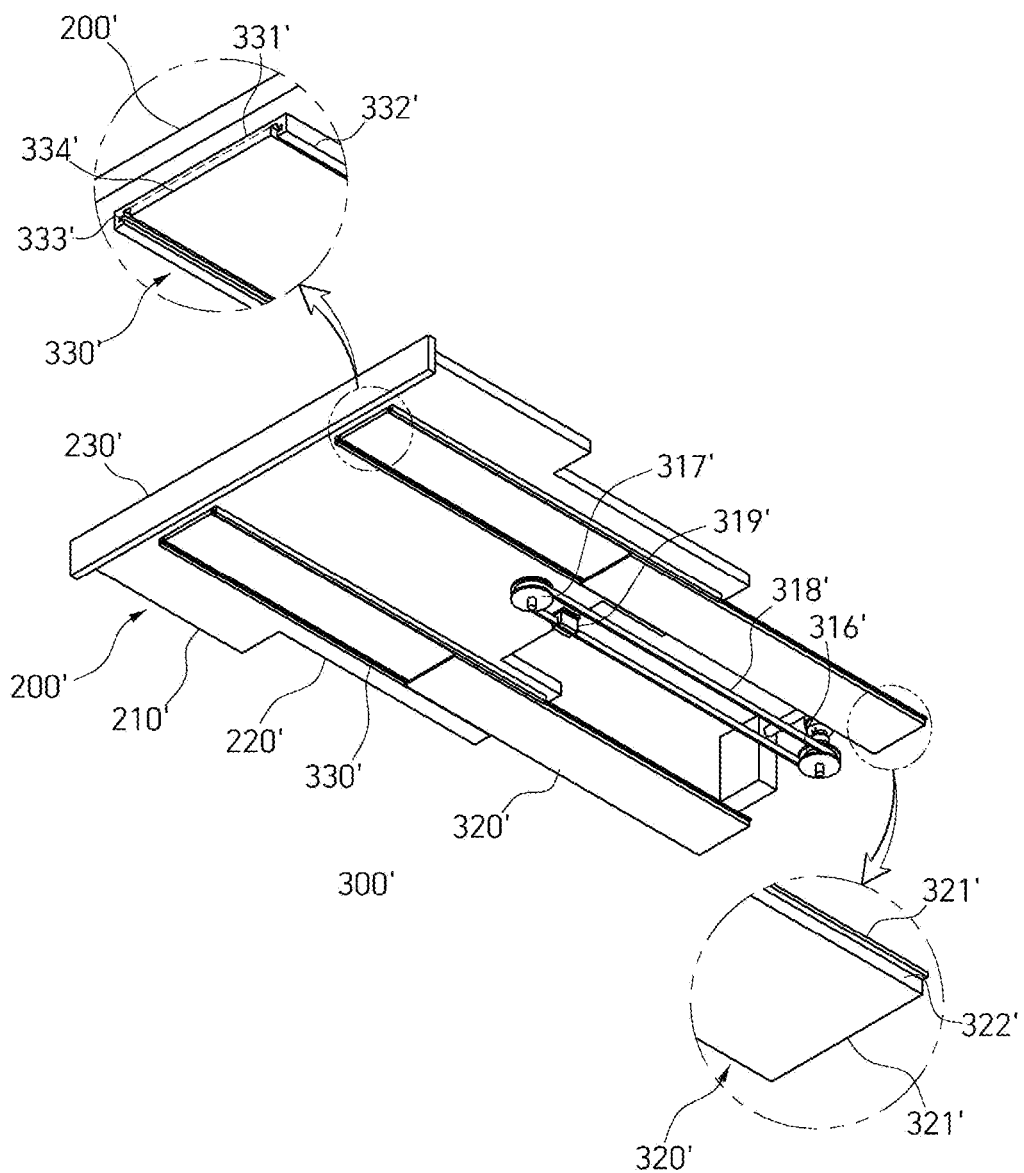
FIG. 17 is a bottom perspective view showing an operation member and the table of the vehicle table device according to the second embodiment of the present disclosure.

FIG. 13 is a perspective view showing a vehicle table device according to a second embodiment of the present disclosure, FIG. 14 is an exploded perspective view showing a table in the vehicle table device according to the second embodiment of the present disclosure, FIG. 15 is a perspective view showing a driving unit of the vehicle table device according to the second embodiment of the present disclosure, FIG. 16 is a front view showing a slip member and a driving pulley of the vehicle table device according to the second embodiment of the present disclosure, and FIG. 17 is a bottom perspective view showing an operation member and the table of the vehicle table device according to the second embodiment of the present disclosure.

Referring to FIGS. 13 to 17, a vehicle table device according to the second embodiment of the present disclosure includes a housing 100', a table 200', and an operation member 300'.

Meanwhile, a detailed description of the same configuration as that described in the above-described embodiments will be omitted so as not to make the subject matter of the present disclosure unclear.

The housing 100' has two side surfaces and a rear surface that are sealed and a front surface that is open.

The table 200' is accommodated in the housing 100' and the housing 100' has an internal space including a first accommodation space 110' and a second accommodation space 120'.

When the housing 100' is accommodated inside the dashboard, the first accommodation space 110' is disposed in an internal direction (engine room direction) of the dashboard, and the second accommodation space 120' is formed at one end (the passenger direction) of the first accommodation space 110'.

A width of the first accommodation space 110' is smaller than a width of the second accommodation space 120', and thus stepped parts 130' are formed between two ends of the first accommodation space 110' and two ends of the second accommodation space 120'.

When the table 200' is accommodated in the second accommodation space 120', the stepped parts 130' come into contact with a rear surface of the table 200', and thus effectively block the table 200' from being excessively retracted up to the first accommodation space 110' when the table 200' that has been extracted to the outside of the housing 100' is retracted into the second accommodation space 120'.

Food or books may be placed on an upper surface of the table 200' when a user eats a simple meal or reads a book.

The table 200' according to the second embodiment of the present disclosure is selectively extracted from or retracted into the open front surface of the housing 100'.

The table 200' includes a base part 210', an extension part 220', and a handle part 230'.

The base part 210' is formed as a quadrangular panel.

The base part 210' is accommodated in the second accommodation space 120' of the housing 100' when the table 200' is not in use and is extracted from the second accommodation space 120' of the housing 100' when the passenger needs to use the table 200'.

A width of the base part 210' is greater than a width of the first accommodation space 110' and is smaller than a width of the second accommodation space 120', and thus when the base part 210' is accommodated in the second accommodation space 120', a rear surface of the base part 210' comes into contact with the stepped parts 130'.

That is, when the base part 210' is retracted into the second accommodation space 120', the base part 210' may be effectively blocked from being excessively retracted up to the first accommodation space 110'.

The extension part 220' extends from the rear surface of the base part 210' and is accommodated in the first accommodation space 110' when the table 200' is retracted into the housing 100'.

The extension part 220' has a width that is smaller than the width of the first accommodation space 110'.

Accordingly, the extension part 220' may be easily accommodated in the first accommodation space 110' when the table 200' is retracted into the housing 100'.

The handle 230' may be disposed on a front surface of the base part 210' and may seal the open front surface of the housing 100' when the table 200' is accommodated in the second accommodation space 120'.

As shown in FIG. 14, the operation member 300' is disposed between a bottom surface of the housing 100' and the table 200'.

Further, the operation member 300' allows the table 200' to be extracted from and retracted into the housing 100'.

The operation member 300' includes a driving unit 310', a fixed rail 320', and a movable rail 330'.

The driving unit 310' is disposed between the bottom surface of the housing 100' and the table 200' and generates power so that the table 200' is selectively extracted from and retracted into the housing 100'.

That is, when a signal is applied through a separate button or the like according to selection of the passenger, the driving unit 310' allows the table 200' to be automatically extracted from and retracted into the housing 100'.

As shown in FIGS. 14 and 15, the driving unit 310' includes an actuator 311', a driving pulley 316', a gear part 312', a slip member 313', a driven pulley 317', and a transfer belt 318'.

The actuator 311' is fixed to the first accommodation space 110' of the housing 100' to generate power.

In more detail, the actuator 311' is fixed to an end of the first accommodation space 110' in a direction in which an engine room is disposed.

The actuator 311' generates power to automatically extract or retract the table 200' from and into the housing 100'.

The gear part 312' is directly connected to the actuator 311' and transmits power generated from the actuator 311' to the driving pulley 316'.

The gear part 312' includes a worm gear 312_1' and a worm wheel gear 312_2'.

The worm gear 312_1' has one end fixed to the actuator 311' and the other end engaged with the worm wheel gear 312_2'.

Thus, the worm gear 312_1' receives power from the actuator 311' to generate a rotational force and transmits the rotational force to the worm wheel gear 312_2'.

The worm wheel gear 312_2' is engaged with the worm gear 312_1', receives, from the worm gear 312_1', the power generated from the actuator 311', and is thus rotated at a right angle with respect to the worm gear 312_1'.

The worm wheel gear 312_2' rotates the slip member 313' through the power generated from the actuator 311'.

The slip member 313' is disposed below the gear part 312' and is coupled to the worm wheel gear 312_2'.

The slip member 313' receives the power generated from the actuator 311' through the gear part 312' to rotate.

The driving pulley 316' is fixed to the first accommodation space 110' of the housing 100', is disposed below the slip member 313', and is coupled to the slip member 313'.

The driving pulley 316' receives the power of the actuator 311' through the gear part 312' and the slip member 313' and is rotated by operating the actuator 311'.

That is, the driving pulley 316' directly receives the power from the actuator 311', thereby serving as a power source.

The driven pulley 317' is fixed to a position spaced a predetermined distance from the driving pulley 316' in the first accommodation space 110' of the housing 100'.

The transfer belt 318' spans between the driven pulley 317' and the driving pulley 316', and the transfer belt 318' is supported together with the driving pulley 316'

The transfer belt 318' has one end connected to the driving pulley 316' serving as a power source and the other end is connected to the driven pulley 317'.

Further, the transfer belt 318' is connected to the table 200' in a middle region.

That is, the transfer belt 318' transfers the table 200' according to the rotation of the driving pulley 316'.

A fixing part 319' is coupled to the transfer belt 318'.

The fixing part 319' is coupled to the middle of the transfer belt 318' and is fixed to the extension part 220' of the table 200' in the engine room direction.

The fixing part 319' moves to a position close to the driving pulley 316' in a state in which the table 200' is accommodated in the housing 100' and moves to a position close to the driven pulley 317' in a state in which the table 200' is extracted from the housing 100'.

That is, the fixing part 319' allows the table 200' to be transferred in a transfer direction of the transfer belt 318'.

Meanwhile, as described above, when a vehicle crash occurs while the table 200' is extracted from the dashboard, an accident may occur due to the table 200', and when a sudden stop/collision occurs in a state in which the table 200' is retracted, the table 200' is unintentionally extracted, which may cause injury to the passenger.

Thus, in a state in which the table 200' is accommodated in the housing 100', when an external force is applied to the table 200' in the passenger direction, the operation member 300' according to the second embodiment of the present disclosure suppresses the table 200' from being extracted from the housing 100'.

In contrast, in a state in which the table 200' is extracted from the housing 100', when an external force is applied to the table 200' in a direction toward the housing 100', the operation member 300' allows the table 200' to be retracted into the housing 100' in a non-powered manner.

To this end, in the second embodiment of the present disclosure, the slip member 313' constituting the operation member 300' blocks the rotation of the gear part 312' when an external force is applied to the table 200' in a direction toward the passenger or in a direction toward the housing 100'.

As shown in FIG. 16, the slip member 313' includes a first slip part 313_1', a second slip part 313_5', a slip spring 314', and a spring support member 315'.

The first slip part 313_1', which is disposed below the gear part 312', includes a first cylindrical portion 313_2', a first inclination portion 313_3', a first vertical portion 313_4'.

The first cylindrical portion 313_2' constitutes a body of the first slip part 313_1' and has a circular shape when viewed from above.

The first inclination portion 313_3' protrudes from a lower surface of the first cylindrical portion 313_2' in a protruding shape inclined in a circumferential direction.

A plurality of first inclination portions 313_3' are formed on the lower surface of the first cylindrical portion 313_2' in the circumferential direction and are inclined in the same direction.

The first vertical portion 313_4' is formed on a side opposite to the first inclination portion 313_3' formed on the lower surface of the first cylindrical portion 313_2' in the circumferential direction.

Thus, when viewed from the side, the first inclination portion 313_3' and the first vertical portion 313_4' are entirely formed in a toothed shape.

Further, the first inclination portion 313_3' and the first vertical portion 313_4' are engaged with each other.

The second slip part 313_5', which is disposed below the first slip part 313_1', rotates together with the first slip part 313_1' or slips from the first slip part 313_1'.

The second slip part 313_5' includes a second cylindrical portion 313_6', a second inclination portion 313_7', a second vertical portion 313_8'.

The second cylindrical portion 313_6' constitutes a body of the second slip part 313_5' and has a circular shape when viewed from above.

The second inclination portion 313_7' protrudes from an upper surface of the second cylindrical portion 313_6' in a protrusion shape inclined in the circumferential direction to correspond to the first inclination portion 313_3'.

A plurality of second inclination portions 313_7' are formed on the upper surface of the second cylindrical portion 313_6' in the circumferential direction and are inclined in the same direction.

Further, the second inclination portions 313_7' are in contact with the plurality of first inclination portions 313_3', respectively.

The second vertical portion 313_8' is formed on a side opposite to the second inclination portion 313_7' formed on the upper surface of the second cylindrical portion 313_6' in the circumferential direction.

Thus, when viewed from the side, the first inclination portion 313_3' and the first vertical portion 313_4' are entirely formed in a toothed shape.

Further, the second vertical portions 313_8' are in contact with the plurality of first vertical portions 313_4', respectively.

That is, the second inclination portions 313_7' are in contact with the first inclination portions 313_3', and the second vertical portions 313_8' are in contact with the first vertical portions 313_4'.

The slip spring 314', which is disposed below the second slip part 313_5', elastically supports the first slip part 313_1'.

Further, the spring support member 315' is disposed between the second slip part 313_5' and a driving pulley 316', has the slip spring 314' accommodated therein, and supports the slip spring 314'.

The fixed rails 320' are disposed to be spaced apart from each other by a distance in the width direction toward the housing 100', are fixed to the bottom surface of the housing 100', and are fixed to cross the first accommodation space 110' and the second accommodation space 120' of the housing 100'.

The fixed rail 320' includes a first body portion 321' and a guide protrusion 323'.

As shown in FIG. 17, the first body portion 321' constitutes a body of the fixed rail 320' and is formed in a long rectangular shape to cross the first accommodation space 110' and the second accommodation space 120' when viewed from below.

Further, two ends of the first body portion 321' extend in a lengthwise direction, and a first side wall 322' having the guide protrusion 323' formed therein and protruding in opposite directions extends upward.

The movable rail 330' is disposed at a position corresponding to the fixed rail 320' so as to be slidably coupled to the fixed rail 320' on a lower surface of the table 200'.

The movable rail 330' includes a second body portion 331', a guide groove 333', and a support protrusion 334'.

As shown in FIG. 17, the second body portion 331' constitutes a body of the movable rail 330' and is formed in a long rectangular shape to cross the first accommodation space 110' and the second accommodation space 120'.

Further, a second side wall 332' having the guide groove 333' extending from an inner surface thereof in a lengthwise direction extends downward from two ends of the second body portion 331'.

Further, the guide protrusion 323' of the fixed rail 320' is slidably coupled to the guide groove 333'.

Accordingly, the movable rail 330' easily slides along the guide protrusion 323' of the fixed rail 320'.

The support protrusion 334' is formed between the second side walls 332' extending downward from the two ends of the second body portion 331' and has an outer surface in contact with an inner surface of the first side wall 322'.

Accordingly, the support protrusion 334' may allow the fixed rail 320' and the movable rail 330' to be firmly assembled with each other and effectively prevent the movable rail 330' from escaping from the fixed rail 320'.

Hereinafter, an operation relationship of the vehicle table device according to the second embodiment of the present disclosure having the above structure will be described with reference to the drawings.

Figure 18:
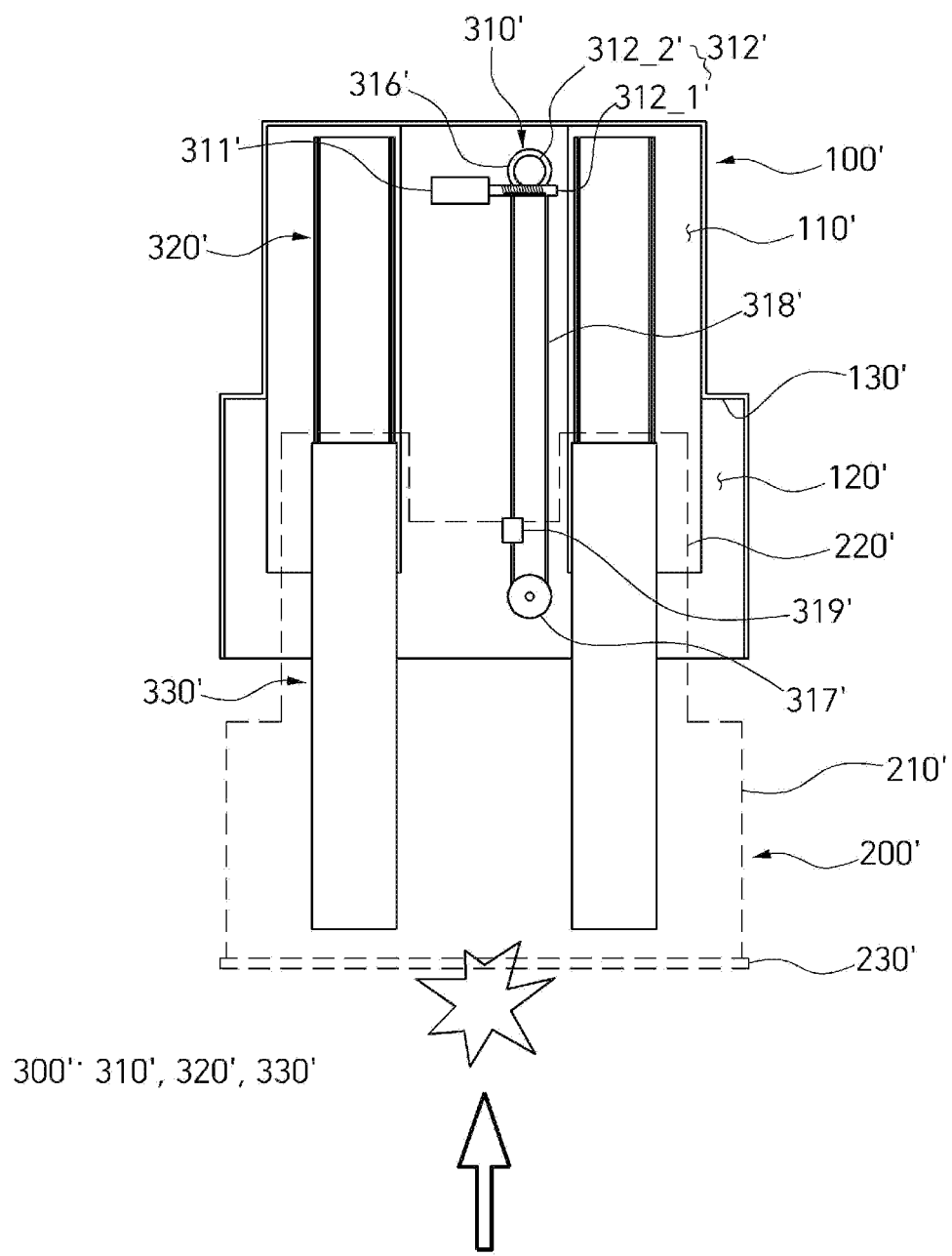
FIGS. 18 and 19 are views showing a state in which the slip member slips while the table of the vehicle table device according to the second embodiment of the present disclosure is extracted from a housing.
Figure 19:
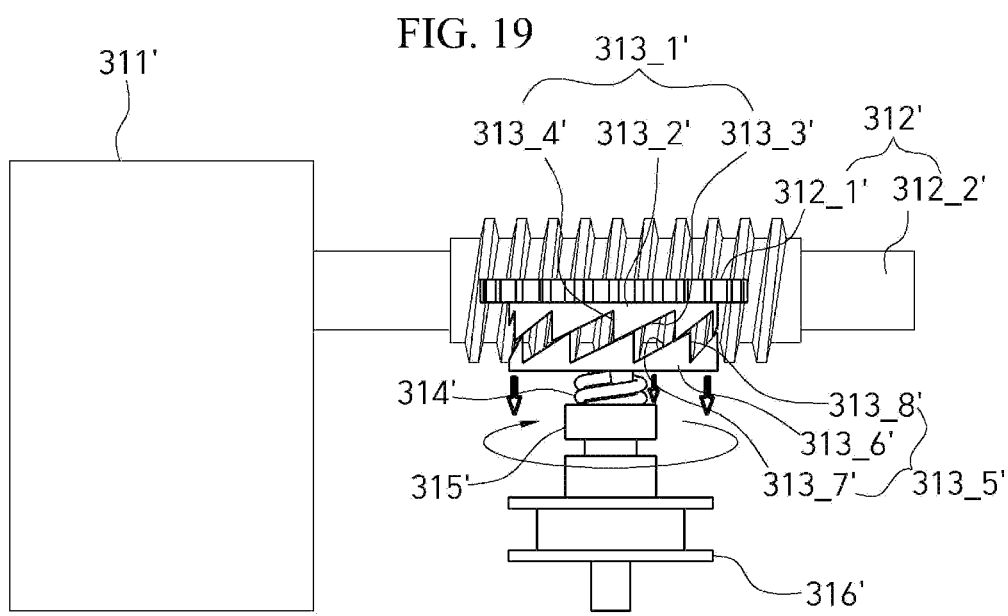
Figure 20:
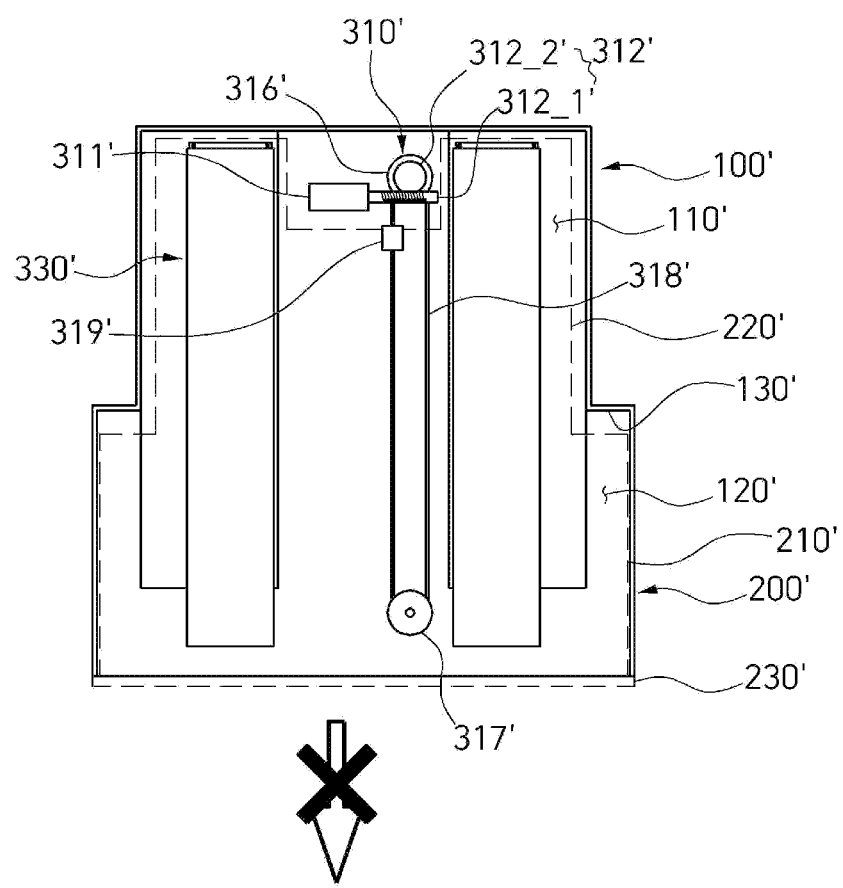
FIGS. 20 to 22 are views showing a state in which a gear part is self-locked while the table of the vehicle table device according to the second embodiment of the present disclosure is retracted into a housing.
Figure 21:
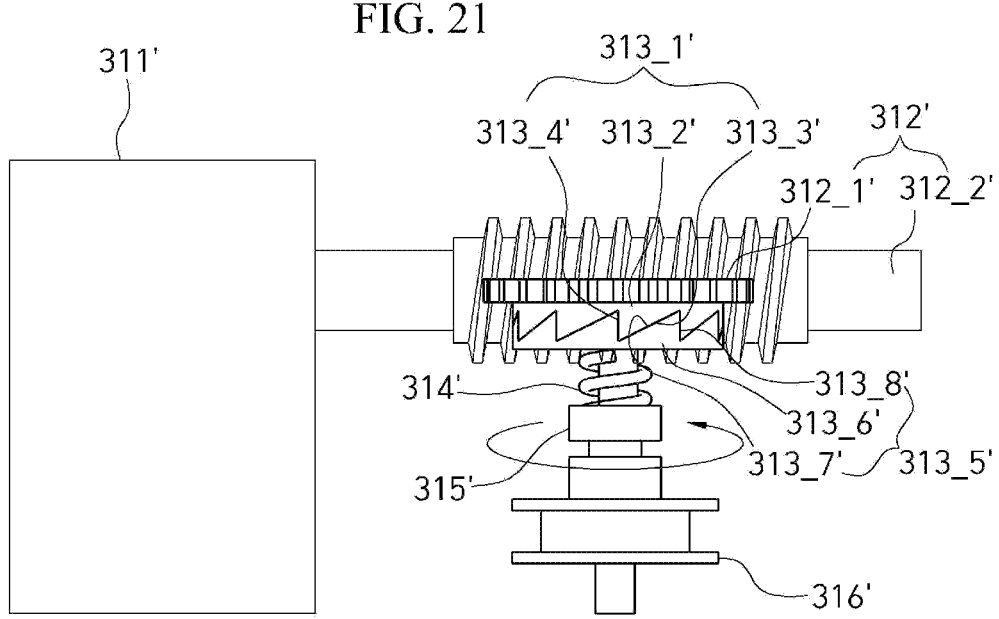
Figure 22:
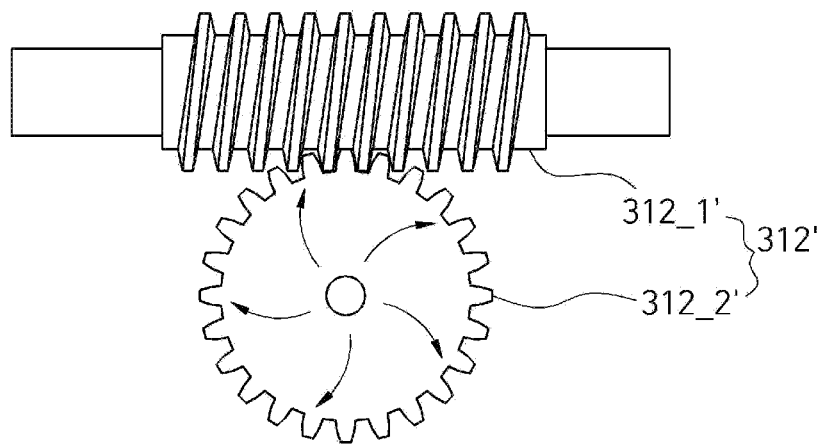

FIGS. 18 and 19 are views showing a state in which the slip member slips while the table of the vehicle table device according to the second embodiment of the present disclosure is extracted from a housing, and FIGS. 20 to 22 are views showing a state in which a gear part is self-locked while the table of the vehicle table device according to the second embodiment of the present disclosure is retracted into a housing.

First, referring to FIGS. 18 and 19, in a state in which the table 200' is extracted from the housing 100', when power is generated by the actuator 311', the power is transmitted to the gear part 312'.

Further, the power is transmitted to the first slip part 313_1' disposed below the worm wheel gear 312_2' of the gear part 312' to rotate the first slip part 313_1'.

In this case, the first vertical portion 313_4' of the first slip part 313_1' presses the second vertical portion 313_8' abutting the first vertical portion 313_4'.

Accordingly, the driving pulley 316' connected to the second slip part 313_5' is rotated, and the table 200' coupled to the driving pulley 316' is transferred to the inside of the housing 100'.

However, in a state in which the table 200' is extracted from the housing 100, when an external force greater than the tensile force of the slip spring 314' is applied to the table 200' in a direction toward the housing 100', as shown in FIG. 19, a pressing force is generated to allow the second slip part 313_5' to be pressed downward by a first inclination surface of the first slip part 313_1'.

Further, the slip spring 314' disposed below the second slip part 313_5' is elastically compressed by the pressing force of the second slip part 313_5', and thus the second slip part 313_5' slips from the first slip part 313_1'.

That is, in the table 200', as the slip spring 314' is elastically pressed by the second slip part 313_5', the second slip part 313_5' is separated from the first slip part 313_1', and thus a rotational force of the driving pulley 316' may be effectively blocked from being transmitted to the first slip part 313_1'.

Accordingly, when the table 200' is retracted into the housing 100', a load may be effectively blocked from being applied to the actuator 311' due to coupling between the slip member 313' and the gear part 312'.

In contrast, referring to FIGS. 20 and 21, in a state in which the table 200' is accommodated in the housing 100', when power is generated by the actuator 311', the power is transmitted to the gear part 312'.

Further, the power is transmitted to the first slip part 313_1' disposed below the worm wheel gear 312_2' of the gear part 312' to rotate the first slip part 313_1'.

In this case, the first inclination portion 313_3' of the first slip part 313_1' presses the second inclination portion 313_7' abutting the first vertical portion 313_4'.

Accordingly, the driving pulley 316' connected to the second slip part 313_5' is rotated and the table 200' coupled to the driving pulley 316' is transferred to the outside of the housing 100'.

However, in a state in which the table 200' is accommodated in the housing 100', when an external force greater than the rotational inertia of the worm wheel gear 312_2' is applied in the passenger direction, as shown in FIGS. 21 and 22, the second vertical portion 313_8' presses the first vertical portion 313_4'.

Further, as the external force greater than the rotational inertia of the worm wheel gear 312_2' is applied to the table 200', a self-locking phenomenon occurs between the worm wheel gear 312_2' and the worm gear 312_1'.

Thus, a vehicle table device in which the rotational force of the driving pulley 316' is blocked from being transferred to the actuator 311' is provided.

The rotation of the worm wheel gear 312_2' and the worm gear 312_1' is blocked due to the self-locking phenomenon, and thus the rotation of the actuator 311' connected to the worm gear 312_1' is also blocked.

That is, the table 200' may be effectively blocked from being extracted to the outside of the housing 100' due to the self-locking between the worm wheel gear 312_2' and the worm gear 312_1'.

That is, due to the slip member 313' according to the second embodiment of the present disclosure, when a vehicle crash occurs in a state in which the table 200' is extracted from the housing 100', the table 200' is easily retracted into the housing 100', and when a vehicle crash occurs in a state in which the table 200' is retracted into the housing 100', the table 200' is prevented from being extracted from the housing 100', and at the same time, a load may be effectively blocked from being applied to the actuator 311'.

Meanwhile, in a table according to the third embodiment, a virtual keyboard may be activated.

Hereinafter, the virtual keyboard activated in the vehicle table device according to the third embodiment of the present disclosure will be described in detail with reference to the accompanying drawings.

Figure 23:
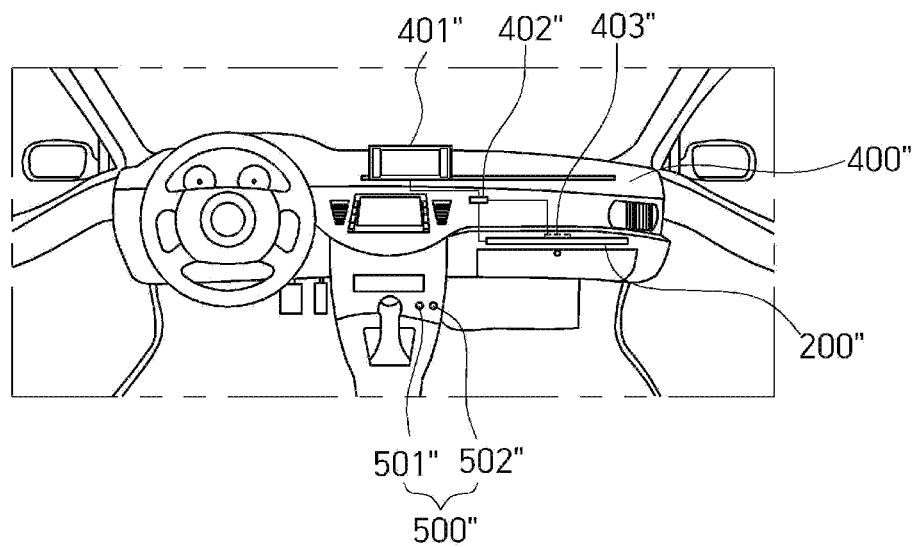
FIG. 23 is a schematic view of a vehicle interior showing a position in which a vehicle table device according to a third embodiment of the present disclosure is mounted.
Figure 24:
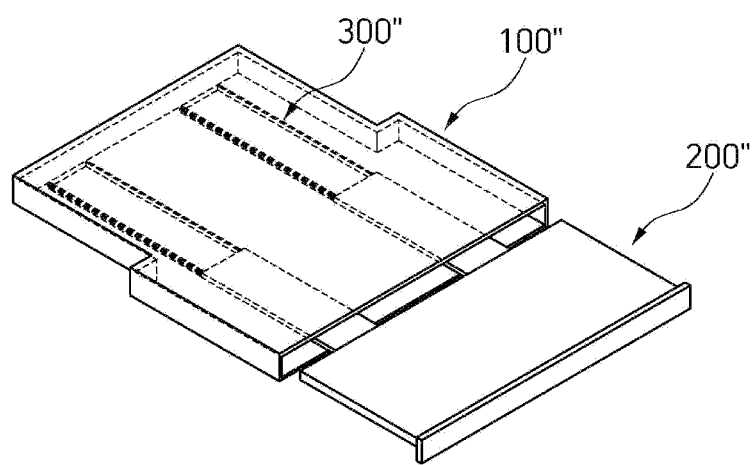
FIG. 24 is a perspective view showing the vehicle table device according to the third embodiment of the present disclosure.

FIG. 23 is a schematic view of a vehicle interior showing a position in which a vehicle table device according to a third embodiment of the present disclosure is mounted, and FIG. 24 is a perspective view showing the vehicle table device according to the third embodiment of the present disclosure.

Referring to FIGS. 23 to 24, a vehicle table device according to the second embodiment of the present disclosure includes a monitor 401", a housing 100", a table 200", an operation member 300", and a controller 402".

Meanwhile, a detailed description of the same configuration as that described in the above-described embodiments will be omitted so as not to make the subject matter of the present disclosure unclear.

The monitor 401" outputs various pieces of information necessary for a vehicle, such as audio, video, and navigation (AVN) of the vehicle.

Further, the monitor 401" outputs information according to input information of a virtual keyboard 201" so that, in the vehicle, a user may perform office work such as simple document work.

The monitor 401" is coupled to reciprocate between a passenger seat side region on a dashboard 400" and a center region of the dashboard 400".

The housing 100" is accommodated in the dashboard 400" and has an open front surface.

The table 200" is accommodated in the housing 100" and is selectively extracted from and retracted into the front surface of the housing 100".

The operation member 300" is disposed between a bottom surface of the housing 100" and the table 200" and thus the table 200" is extracted from and retracted into the housing 100".

The housing 100", the table 200", and the operation member 300" according to the third embodiment of the present disclosure have the configuration identical or similar to those according to the first embodiment and the second embodiment of the present disclosure, and thus a detailed description will be omitted so as not to make the subject matter of the present disclosure unclear.

The controller 402" selectively activates or deactivates the virtual keyboard 201" on an upper surface of the table 200" extracted from the housing 100" according to selection of a user.

In detail, the controller 402" activates, on the table 200", a virtual keyboard on/off button 202" for activating or deactivating the virtual keyboard 201" on the table 200".

Further, when a user touches the virtual keyboard on/off button 202" in a state in which the table 200" is extracted from the housing 100" and the monitor 401" is located on a passenger side, the controller 402" activates the virtual keyboard 201" on the upper surface of the table 200".

As a result, in the present disclosure, the virtual keyboard 201" is activated on the upper surface of the table 200" in a state in which the monitor 401" is located on the passenger side, and thus a user may utilize the vehicle table device as a simple office work space in the vehicle through a multimedia input device function such as the monitor 401" and the virtual keyboard 201".

Meanwhile, the monitor 401" and the table 200" may be operated through a separate operation switch 500".

The operation switch 500" may be mounted at a position at which the driver or passenger may easily perform the operation on the dashboard 400".

The operation switch 500" includes a monitor movement switch 501" and a table operation switch 502".

The monitor movement switch 501" may move the monitor 401" between the driver seat side and the passenger seat side or to the passenger side on the dashboard 400" according to selection of a user.

Further, the table operation switch 502" may extract or retract the table 200" from or into the housing 100" according to selection of a user.

Thus, the monitor 401" and the table 200" are operated through the operation switch 500".

Hereinafter, a method of controlling a virtual keyboard of a vehicle table device according to a third embodiment of the present disclosure will be described in detail with reference to the accompanying drawings.

Figure 25:
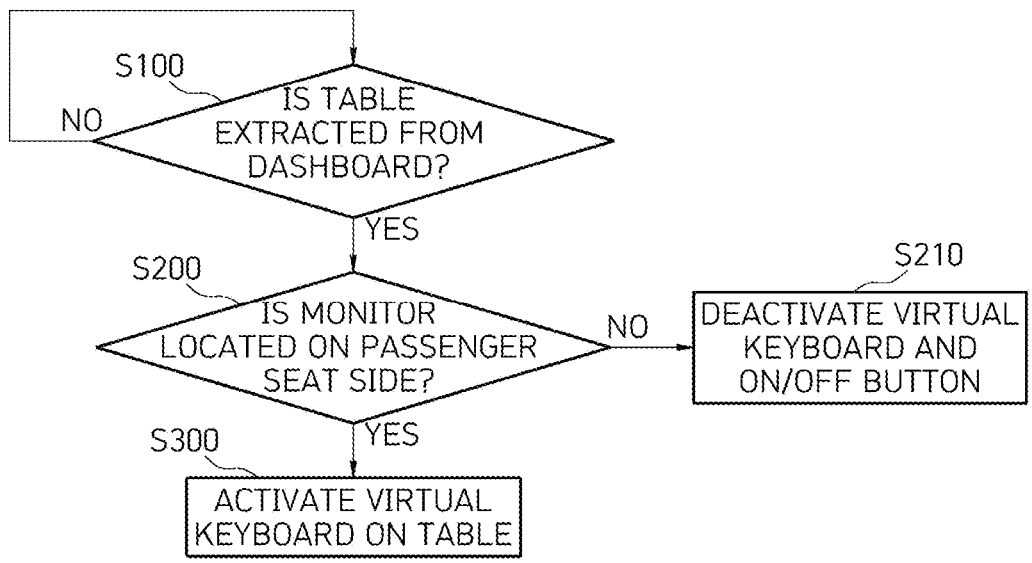
FIGS. 25 and 26 are flowcharts showing a method of controlling a virtual keyboard of the vehicle table device according to the third embodiment of the present disclosure.
Figure 26:
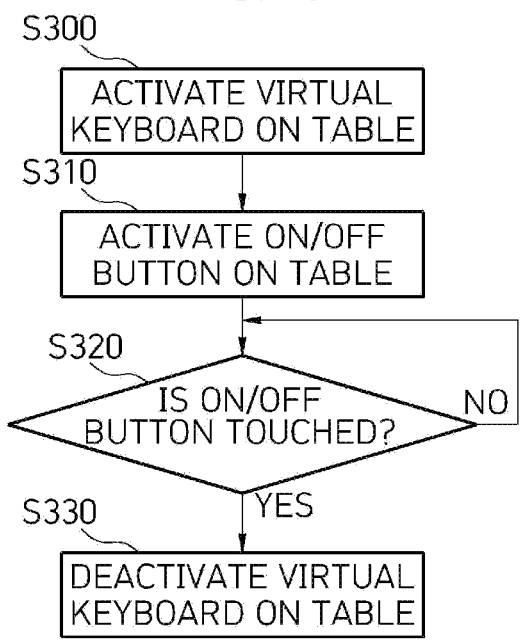
Figure 27:
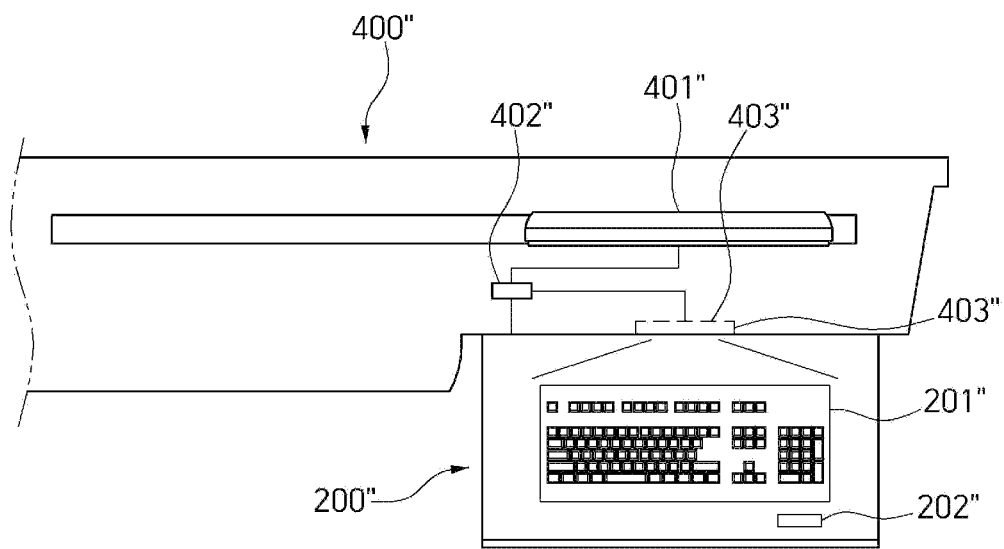
FIGS. 27 to 29 are schematic views showing a state in which the virtual keyboard is activated or deactivated in the table for each situation of the vehicle table device according to the third embodiment of the present disclosure.
Figure 28:
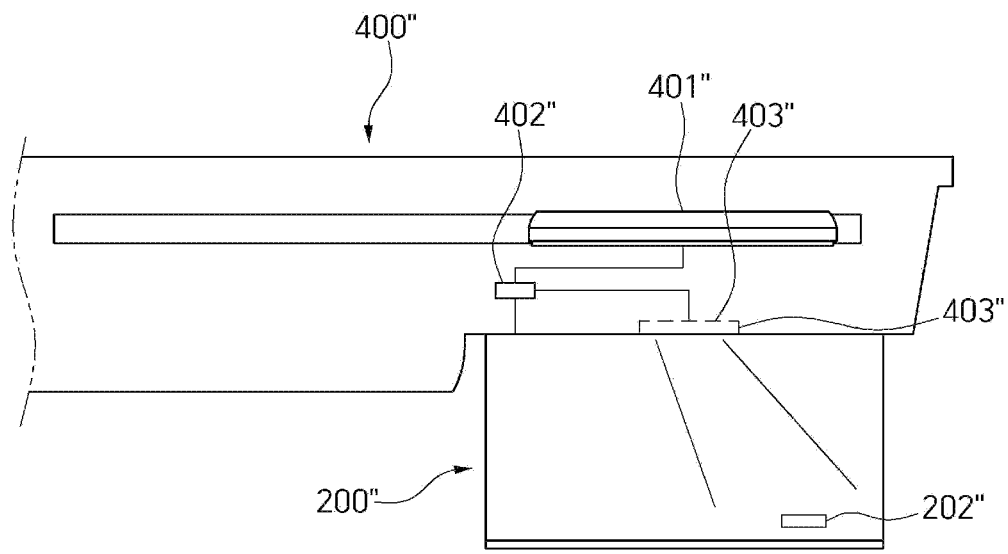

FIGS. 25 and 26 are flowcharts showing a method of controlling a virtual keyboard of the vehicle table device according to the third embodiment of the present disclosure, FIG. 27 is a schematic view showing a state in which the virtual keyboard is activated on the table of the vehicle table device according to the third embodiment of the present disclosure, and FIG. 28 is a schematic view showing a state in which the virtual keyboard is deactivated on the table of the vehicle table device according to the third embodiment of the present disclosure.

First, referring to FIG. 25, the controller 402" determines a state of the table 200" accommodated in the housing 100" (S100).

Operation S100 of determining the state of the table 200" by the controller 402" is an operation of determining whether or not the table 200" is retracted into or extracted from the housing 100" accommodated inside the dashboard 400".

In operation S100 of determining the state of the table 200" by the controller 402", when the table 200" is extracted from the housing 100" in the passenger direction, the controller 402" determines the position of the monitor 401" (S200).

Operation S200 of determining the position of the monitor 401" by the controller 402" is an operation of determining whether the monitor 401" is located between the driver seat side and the passenger seat side on the dashboard 400", that is, in a center region of the dashboard 400", or in the passenger seat side region.

In operation S200 of determining the position of the monitor 401" by the controller 402", when the monitor 401" is located in the passenger seat side region, as shown in FIG. 27, the controller 402" activates the virtual keyboard 201" on the table 200" (S300).

As a result, in the present disclosure, the virtual keyboard 201" is activated on the upper surface of the table 200" in a state in which the monitor 401" is located on the passenger seat side region, and thus a user may utilize the vehicle table device as a simple office work space in the vehicle through the monitor 401" and the virtual keyboard 201".

Further, referring to FIG. 26, in operation S300 of activating the virtual keyboard 201" on the table 200", the controller 402" activates the virtual keyboard on/off button 202" on the upper surface of the table 200" (S310).

Further, the controller 402" determines whether or not the activated virtual keyboard on/off button 202" is touched (S320).

When a user touches the virtual keyboard on/off button 202" activated on the upper surface of the table 200", the controller 402" deactivates the virtual keyboard 201" on the table 200" (S330).

Operation S320 of determining whether or not the virtual keyboard on/off button 202" is touched by the controller 402" is an operation of determining whether to activate or deactivate the virtual keyboard 201" on the table 200".

That is, when the virtual keyboard on/off button 202" is touched according to selection of a user in a state in which the virtual keyboard 201" is activated on the upper surface of the table 200", as shown in FIG. 28, the virtual keyboard 201" implemented on the upper surface of the table 200" is deactivated.

As a result, the virtual keyboard 201" may be blocked from being unintentionally activated on the upper surface of the table 200", and food or books for a simple meal or reading may be placed on the upper surface of the table 200".

Figure 29:
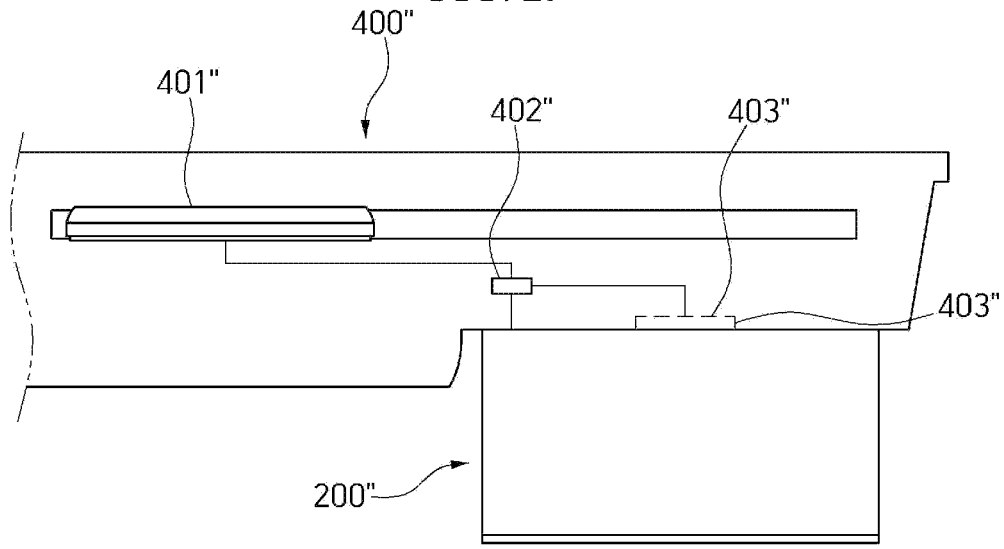

Meanwhile, referring back to FIG. 25, in operation S200 of determining the position of the monitor 401", when the monitor 401" is located not on the passenger side but between the driver seat side and the passenger seat side, that is, in the center region of the dashboard 400", as shown in FIG. 29, the controller 402" deactivates the virtual keyboard 201" and the virtual keyboard on/off button 202" on the table 200" (S210).

As a result, food or books for a simple meal or reading may be placed on an upper surface of the table 200".

Meanwhile, the activation refers to the implementation of the virtual keyboard 201" on the upper surface of the table 200" by a projector 403".

The projector 403" implements the virtual keyboard 201" on the upper surface of the table 200" in an infrared manner and recognizes a hand gesture of a user using a sensing function of an infrared camera constituting the projector 403".

The recognized input information of the virtual keyboard 201" is transmitted to the monitor 401" through Bluetooth or the like.

The activation has been described as implementing the virtual keyboard 201" on the upper surface of the table 200" through the projector 403", but the upper surface of the table 200" may be realized as a touch screen.

Further, the controller 402 may include a table state determination unit that determines a state of the table 200" and a monitor position determination unit that determines the position of the monitor 401".

That is, the table state determination unit determines whether the table 200" is extracted from the housing 100" or retracted into the housing 100".

Hereinafter, a method of controlling a virtual keyboard of a vehicle table device according to a fourth embodiment of the present disclosure will be described in detail with reference to the accompanying drawings.

Figure 30:
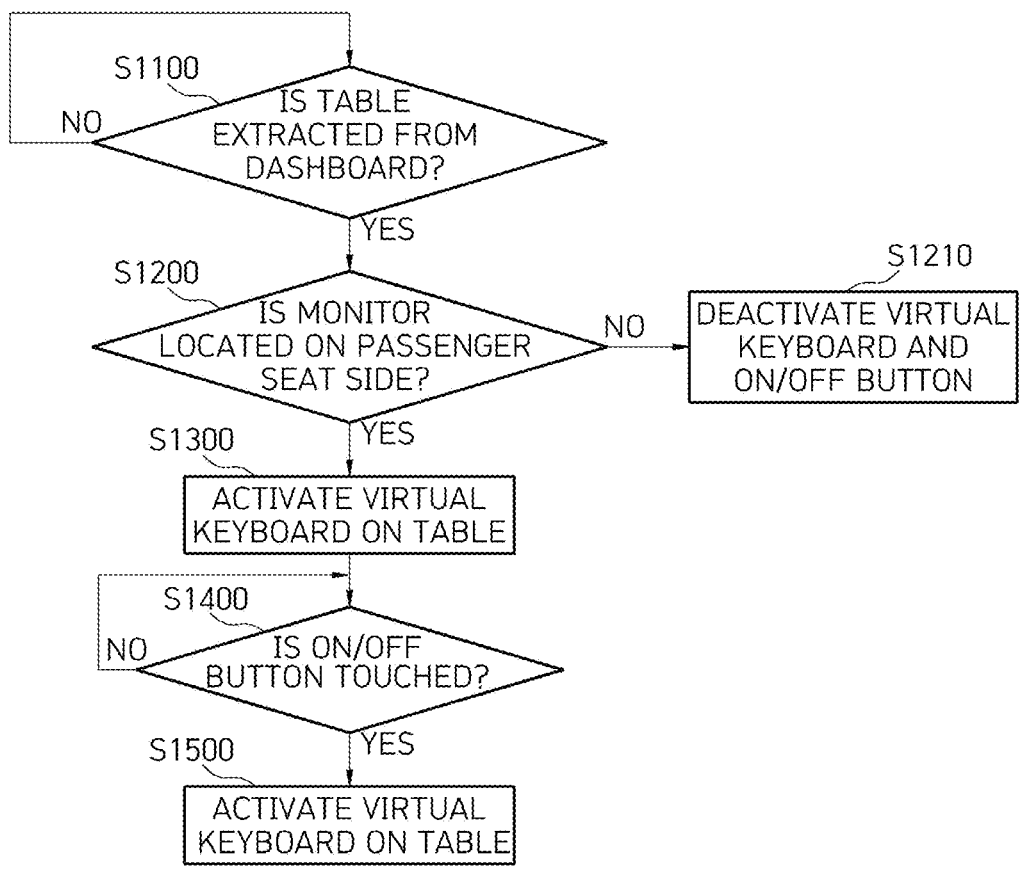
FIGS. 30 to 31 are flowcharts showing a method of controlling a virtual keyboard of a vehicle table device according to a fourth embodiment of the present disclosure.
Figure 31:
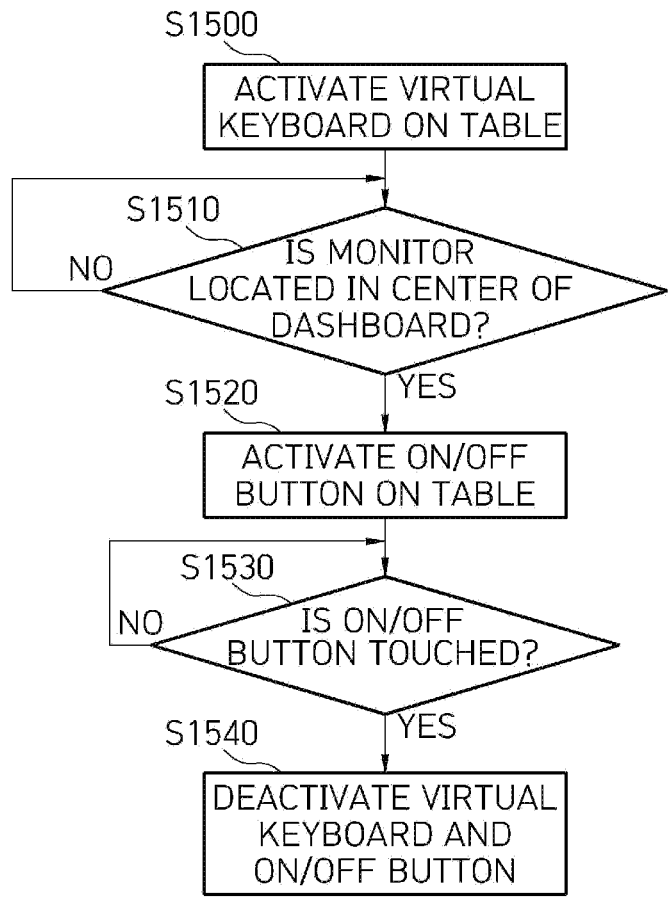
Figure 32:
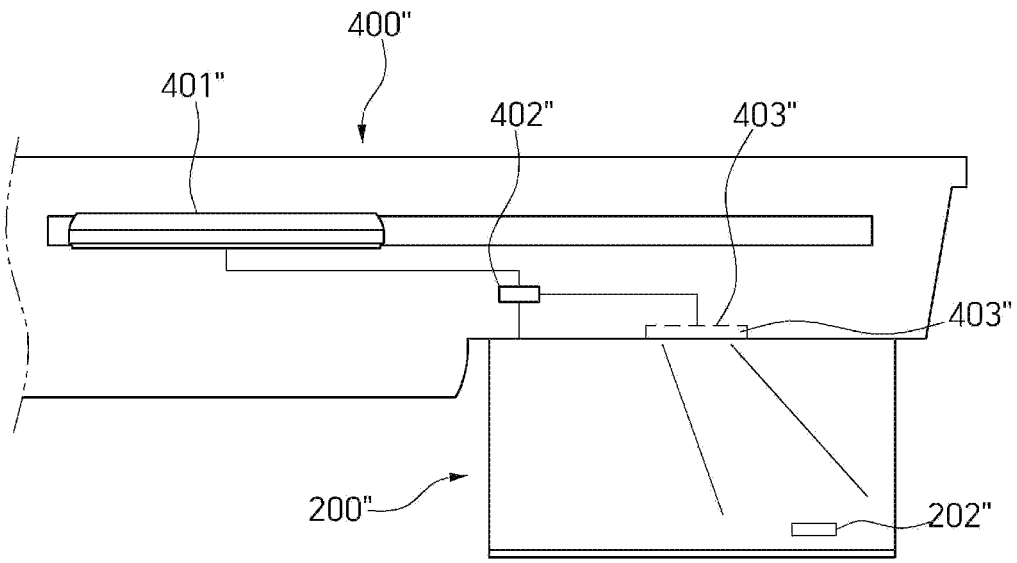
FIGS. 32 and 33 are schematic views showing a state in which the virtual keyboard is activated or deactivated in the table for each situation of the vehicle table device according to the fourth embodiment of the present disclosure.
Figure 33:
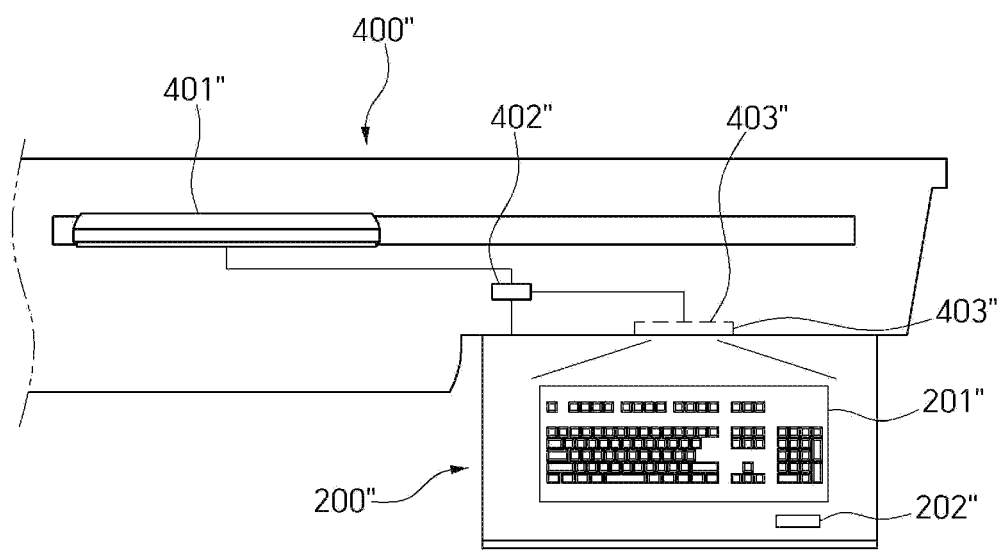

FIGS. 30 to 31 are flowcharts showing a method of controlling a virtual keyboard of a vehicle table device according to a fourth embodiment of the present disclosure, and FIGS. 32 and 33 are schematic views showing a state in which the virtual keyboard is activated or deactivated in the table for each situation of the vehicle table device according to the fourth embodiment of the present disclosure.

First, referring to FIG. 30, the controller 402" determines a state of the table 200" accommodated inside the housing 100" (S1100).

In operation S1100 of determining the state of the table 200" by the controller 402", when the table 200" is extracted from the housing 100" in the passenger direction, the controller 402" determines the position of the monitor 401" (S1200).

In operation S1200 of determining the position of the monitor 401" by the controller 402", when the monitor 401" is located in the passenger seat side region, as shown in FIG. 28, the controller 402" activates the virtual keyboard on/off button 202" on the table 200" (S1300).

Further, the controller 402" determines whether or not the activated virtual keyboard on/off button 202" is touched (S1400).

When a user touches the virtual keyboard on/off button 202" activated on the upper surface of the table 200", as shown in FIG. 27, the controller 402" activates the virtual keyboard 201" on the table 200" (S1500).

As a result, in the present disclosure, the virtual keyboard 201" is activated on the upper surface of the table 200" in a state in which the monitor 401" is located on the passenger side, and thus a user may utilize the vehicle table device as a simple office work space in the vehicle through a multimedia input device function such as the monitor 401" and the virtual keyboard 201".

In particular, in operation S1300 of activating the virtual keyboard on/off button 202" on the table 200", whether or not the virtual keyboard on/off button 202" is activated may be selected in advance before the virtual keyboard 201" is activated, thus when a user eats a simple meal or reads a book on the upper surface of the table 200", the virtual keyboard 201" can be prevented from being accidentally touched.

As a result, the virtual keyboard 201" may be blocked from being unintentionally activated on the upper surface of the table 200" in advance, and food or books for a simple meal or reading may be placed on the upper surface of the table 200".

Further, referring to FIG. 31, operation S1500 of activating the virtual keyboard 201" on the table 200" by the controller 402" may include operation S1510 of determining the position of the monitor 401" by the controller 402".

In operation S1510 of determining the position of the monitor 401" by the controller 402", when the monitor 401" is located between the driver seat side and the passenger seat side, that is, the center region of the dashboard 400", as shown in FIG. 32, the controller 402" activates the virtual keyboard on/off button 202" on the table 200" (S1520).

Further, the controller 402" determines whether or not the activated virtual keyboard on/off button 202" is touched (S1530).

In operation S1530 of determining whether or not the activated virtual keyboard on/off button 202" is touched by the controller 402", when the virtual keyboard on/off button 202" is touched, as shown in FIG. 29, the controller 402" deactivates the virtual keyboard 201" on the table 200" (S1540).

Thus, according to a situation, the table 200" may be retracted into the housing 100", and food or books for a simple meal or reading may be placed on the upper surface of the table 200".

However, in operation S1530 of determining whether or not the activated virtual keyboard on/off button 202" is touched by the controller 402", when the virtual keyboard on/off button 202" is not touched, as shown in FIG. 33, even in a state in which the monitor 401" is moved to the center of the dashboard 400", the virtual keyboard 201" activated on the upper surface of the table 200" may be maintained in an activated state.

As a result, in a state in which the virtual keyboard 201" is activated on the upper surface of the table 200", the monitor 401" may be disposed between the driver seat side and the passenger seat side, that is, in the center region of the dashboard 400", and thus even in a state in which the virtual keyboard 201" is activated on the upper surface of the table 200", a driver may easily identify contents output on the monitor 401".

Meanwhile, referring back to FIG. 30, in operation S1200 of determining the position of the monitor 401" by the controller 402", when the monitor 401" is located between the driver seat side and the passenger seat side, that is, the center region of the dashboard 400", as shown in FIG. 29, the controller 402" deactivates the virtual keyboard on/off button 202" on the table 200" (S1210).

Thus, as the virtual keyboard 201" and the virtual keyboard on/off button 202" are deactivated, when a user eats a simple meal or reads a book on the upper surface of the table 200", accidental touching of the virtual keyboard on/off button 202" can be prevented.

As a result, the virtual keyboard 201" may be blocked from being unintentionally activated on the upper surface of the table 200", and food or books for a simple meal or reading may be placed on the upper surface of the table 200".

According to the present disclosure, when a table is extracted from a housing and a user touches a virtual keyboard on/off button in a state in which a monitor is located on a passenger seat side, a virtual keyboard is activated on an upper surface of the table, and thus the table can be used as a simple office space in a vehicle through a multimedia input device function of the monitor and the virtual keyboard.

Further, by touching the virtual keyboard on/off button according to selection of a user, an undesired virtual keyboard can be blocked from being activated on the upper surface of the table, and foods or books for a simple meal or reading can be placed on the upper surface of the table.

According to the present disclosure, when a vehicle crash occurs in a state in which a table is extracted from a housing, the table can be easily retracted into the housing, and when a vehicle crash occurs in a state in which the table is retracted into the housing, the table can be prevented from being extracted from the housing, and at the same time, a load can be effectively blocked from being applied to an actuator.

In this way, the embodiments disclosed in the present specification should be considered not in a limiting viewpoint but in an exemplary viewpoint. The scope of the present disclosure is indicated not in the above description but in the appended claims, and all differences within the scope equivalent thereto should be construed as being included in the present disclosure.

What is claimed is:

1. A vehicle table device comprising:
a housing that is accommodated inside a dashboard and has an open front surface;
a table that is accommodated inside the housing and selectively extracted from or retracted into the front surface of the housing; and
an operation member that is disposed between a bottom surface of the housing and the table and configured to allow the table to be extracted from or retracted into the housing,
wherein the operation member comprises a driving unit that is disposed between the housing and the table, the driving unit including an actuator configured to generate power so as to automatically extract or retract the table from and into the housing.

2. The vehicle table device of claim 1, wherein the operation member is configured to suppress the table from being extracted from the housing when the table is accommodated in the housing and an external force is applied to the table in a direction toward a passenger, and
the operation member retracts the table into the housing in a non-powered manner when the table is extracted from the housing and an external force is applied in a direction toward the housing.

3. The vehicle table device of claim 1, wherein the housing includes:
a first accommodation space; and
a second accommodation space which is formed at one end of the first accommodation space and in which the table is accommodated.

4. The vehicle table device of claim 3, wherein the table includes:
a base part that has a quadrangular panel and is accommodated in the second accommodation space;
an extension part that extends from a rear surface of the base part and is accommodated in the first accommodation space; and
a handle part that is disposed on a front surface of the base part,
wherein the operation member is disposed on a lower surface of the base part.

5. The vehicle table device of claim 4, wherein a width of the first accommodation space is smaller than a width of the second accommodation space in a width direction, and
stepped parts are respectively formed between two ends of the first accommodation space in the width direction and two ends of the second accommodation space in the width direction.

6. The vehicle table device of claim 5, wherein a width of the base part is greater than the width of the first accommodation space and smaller than the width of the second accommodation space.

7. The vehicle table device of claim 6, wherein, when the base part is accommodated in the second accommodation space, the rear surface of the base part comes into contact with the stepped parts.

8. The vehicle table device of claim 1, wherein the operation member further includes:
a fixed rail that is fixed to the bottom surface of the housing; and
a movable rail that is disposed on a lower surface of the table and slidably coupled to the fixed rail.

9. The vehicle table device of claim 8, wherein the driving unit includes:
the actuator that is fixed to the bottom surface of the housing and configured to generate power;
a gear part that is connected to the actuator and configured to receive the power generated from the actuator;
a slip member that is coupled to the gear part and configured to receive the power generated from the actuator through the gear part;
a driving pulley that is fixed to the bottom surface of the housing and is rotatable by operation of the actuator;
a driven pulley fixed to a position spaced apart from the driving pulley on the bottom surface of the housing; and
a transfer belt that has one end connected to the driving pulley, the other end connected to the driven pulley, and a center region connected to the table, and configured to transfer the table according to rotation of the driving pulley.

10. The vehicle table device of claim 9, wherein the slip member blocks rotation of the gear part when an external force is applied to the table in a direction toward a passenger or a direction toward the housing.

11. The vehicle table device of claim 9, wherein the slip member includes:
a first slip part that is disposed below the gear part;
a second slip part that is disposed below the first slip part and configured to rotate together with the first slip part or to slip from the first slip part;
a slip spring that is disposed below the second slip part and configured to elastically support the first slip part; and
a spring support member that is disposed between the second slip part and the driving pulley, has the slip spring accommodated therein, and is configured to support the slip spring.

12. The vehicle table device of claim 11, wherein the first slip part includes:
a first cylindrical part that constitutes a body of the first slip part;
a plurality of first inclination portions that are formed on a lower surface of the first cylindrical part in a circumferential direction; and
a plurality of first vertical portions that are formed on the lower surface of the first cylindrical part on sides opposite to the first inclination portions, and
the second slip part includes:
a second cylindrical part that constitutes a body of the second slip part;
a plurality of second inclination portions that are formed on an upper surface of the second cylindrical part in a circumferential direction and each are in contact with one of the plurality of first inclination portions; and
a plurality of second vertical portions that are formed on the upper surface of the second cylindrical part on sides opposite to the second inclination portions and each are in contact with one of the plurality of first vertical portions.

13. The vehicle table device of claim 12, wherein, in a state in which the table is accommodated in the housing, when an external force greater than a rotational inertia of a worm wheel gear is applied to the table in a direction toward a passenger, the second vertical portions press the first vertical portions, a self-locking phenomenon occurs between the worm wheel gear and a worm gear, and thus a rotational force of the driving pulley is blocked from being transferred to the actuator.

14. The vehicle table device of claim 12, wherein, in a state in which the table is extracted from the housing, when an external force greater than a tensile force of the slip spring is applied to the table in a direction toward the housing, the first inclination portions slip from the second inclination portions, the second slip parts are separated from the first slip parts, and thus a rotational force of the driving pulley is blocked from being transferred to the first slip part.

15. The vehicle table device of claim 9, wherein a fixing part fixed to the table so that the table is transferred in a transfer direction of the transfer belt is coupled to the center region of the transfer belt.

16. The vehicle table device of claim 15, wherein the fixing part is located to be adjacent to the driving pulley in a state in which the table is accommodated in the housing, and the fixing part is located adjacent to the driven pulley in a state in which the table is extracted from the housing.

17. A vehicle table device comprising:
a housing that is accommodated inside a dashboard and has an open front surface;
a table that is accommodated inside the housing and selectively extracted from or retracted into the front surface of the housing; and
an operation member that includes a fixed rail fixed to a bottom surface of the housing, a movable rail slidably coupled to the fixed rail and fixed to a lower surface of the table, and a driving unit disposed between the housing and the table to generate power.

18. The vehicle table device of claim 17, wherein a width of the fixed rail is smaller than a width of the movable rail.

19. The vehicle table device of claim 17, wherein the fixed rail includes:
a first body portion that constitutes a body of the fixed rail, is fixed to the bottom surface of the housing, and has first side walls extending upward from two ends thereof; and
guide protrusions that extend from the first side walls in a lengthwise direction and protrude in opposite directions, and the movable rail includes:
a second body portion that constitutes a body of the movable rail, is disposed below the table, and has second side walls extending downward from two ends thereof;
guide grooves which are formed in inner surfaces for the second side walls, respectively, and extend in the lengthwise direction and into which the guide protrusions are inserted; and
a support protrusion that is formed between the second side walls and has an outer surface supporting inner surfaces of the first side walls.

* * * * *